United States Patent
Mack et al.

(10) Patent No.: US 10,968,625 B2
(45) Date of Patent: Apr. 6, 2021

(54) VACUUM INSULATION PANEL

(71) Applicant: Kingspan Holdings (IRL) Limited, Cavan (IE)

(72) Inventors: Daniel Mack, Hereford (GB); Malcolm Rochefort, Ludlow (GB)

(73) Assignees: Kingspan Insulation Limited, Leominster (GB); Kingspan Holdings (IRL) Limited, Kingscourt (IE)

( * ) Notice: Subject to any disclaimer, the term of this patent is extended or adjusted under 35 U.S.C. 154(b) by 0 days.

(21) Appl. No.: 16/381,073

(22) Filed: Apr. 11, 2019

(65) Prior Publication Data
US 2019/0234068 A1     Aug. 1, 2019

Related U.S. Application Data

(63) Continuation of application No. PCT/EP2017/075212, filed on Oct. 4, 2017.

(30) Foreign Application Priority Data

Oct. 13, 2016  (GB) .................................. 1617399.9

(51) Int. Cl.
*F16L 59/065* (2006.01)
*E04B 1/80* (2006.01)
(Continued)

(52) U.S. Cl.
CPC ................ *E04B 1/803* (2013.01); *B32B 3/04* (2013.01); *B32B 3/08* (2013.01); *B32B 5/16* (2013.01); *B32B 15/08* (2013.01); *B32B 15/095* (2013.01); *B32B 15/16* (2013.01); *B32B 27/08* (2013.01); *B32B 27/40* (2013.01); *B32B 2250/40* (2013.01); *B32B 2250/44* (2013.01); *B32B 2255/06* (2013.01); *B32B 2255/10* (2013.01);
(Continued)

(58) Field of Classification Search
CPC .... Y10T 428/231; F16L 59/065; E04B 1/803; B32B 3/04; B32B 5/16; B32B 15/08; B32B 15/095
See application file for complete search history.

(56) References Cited

U.S. PATENT DOCUMENTS

| 10,173,354 B2* | 1/2019 | Mack ........................ B32B 5/16 |
| 2003/0082357 A1* | 5/2003 | Gokay ...................... B32B 7/02 |
| | | 428/212 |

(Continued)

FOREIGN PATENT DOCUMENTS

| EP | 0446486 A2 | 9/1991 |
| EP | 2607073 A2 | 6/2013 |

(Continued)

OTHER PUBLICATIONS

Internationl Search Report for PCT/EP2017/075212 dated Dec. 15, 2017.

*Primary Examiner* — Alexander S Thomas
(74) *Attorney, Agent, or Firm* — Harness, Dickey & Pierce, P.L.C.

(57) ABSTRACT

Vacuum insulation panels, methods for manufacture thereof, and applications thereof are described. The vacuum insulation panels comprise a porous insulating core encapsulated in an envelope to which a vacuum is applied. The envelope is coated with a waterproof coating layer which increases the robustness of the vacuum insulation panel.

21 Claims, 15 Drawing Sheets

(51) Int. Cl.
    *B32B 5/16*         (2006.01)
    *B32B 15/16*      (2006.01)
    *B32B 27/08*      (2006.01)
    *B32B 3/04*        (2006.01)
    *B32B 3/08*        (2006.01)
    *B32B 15/08*      (2006.01)
    *B32B 15/095*     (2006.01)
    *B32B 27/40*      (2006.01)

(52) U.S. Cl.
    CPC ....... *B32B 2255/26* (2013.01); *B32B 2264/10* (2013.01); *B32B 2264/102* (2013.01); *B32B 2264/107* (2013.01); *B32B 2264/12* (2013.01); *B32B 2305/026* (2013.01); *B32B 2307/304* (2013.01); *B32B 2307/72* (2013.01); *B32B 2307/7242* (2013.01); *B32B 2307/7244* (2013.01); *B32B 2375/00* (2013.01); *B32B 2405/00* (2013.01); *B32B 2607/02* (2013.01); *F16L 59/065* (2013.01); *F25D 2201/00* (2013.01); *Y02A 30/242* (2018.01); *Y02B 80/10* (2013.01); *Y10T 428/231* (2015.01)

(56) References Cited

U.S. PATENT DOCUMENTS

2007/0196665 A1    8/2007    Tenra et al.
2012/0318808 A1*  12/2012   McCormick .......... F16L 59/065
                                                          220/592.21

FOREIGN PATENT DOCUMENTS

WO      WO-00/60184 A1     10/2000
WO      WO-2016/087387 A1   6/2016

* cited by examiner

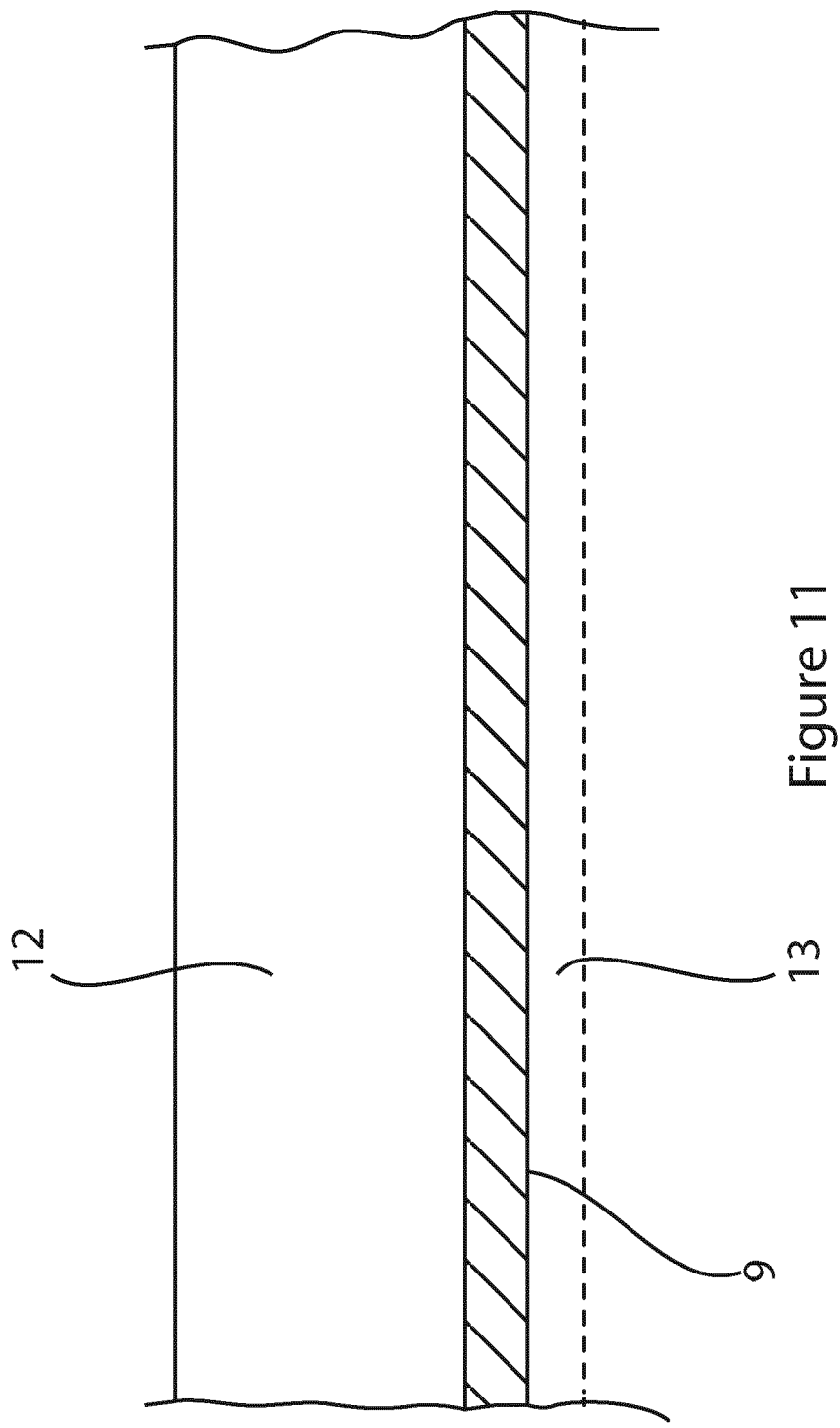

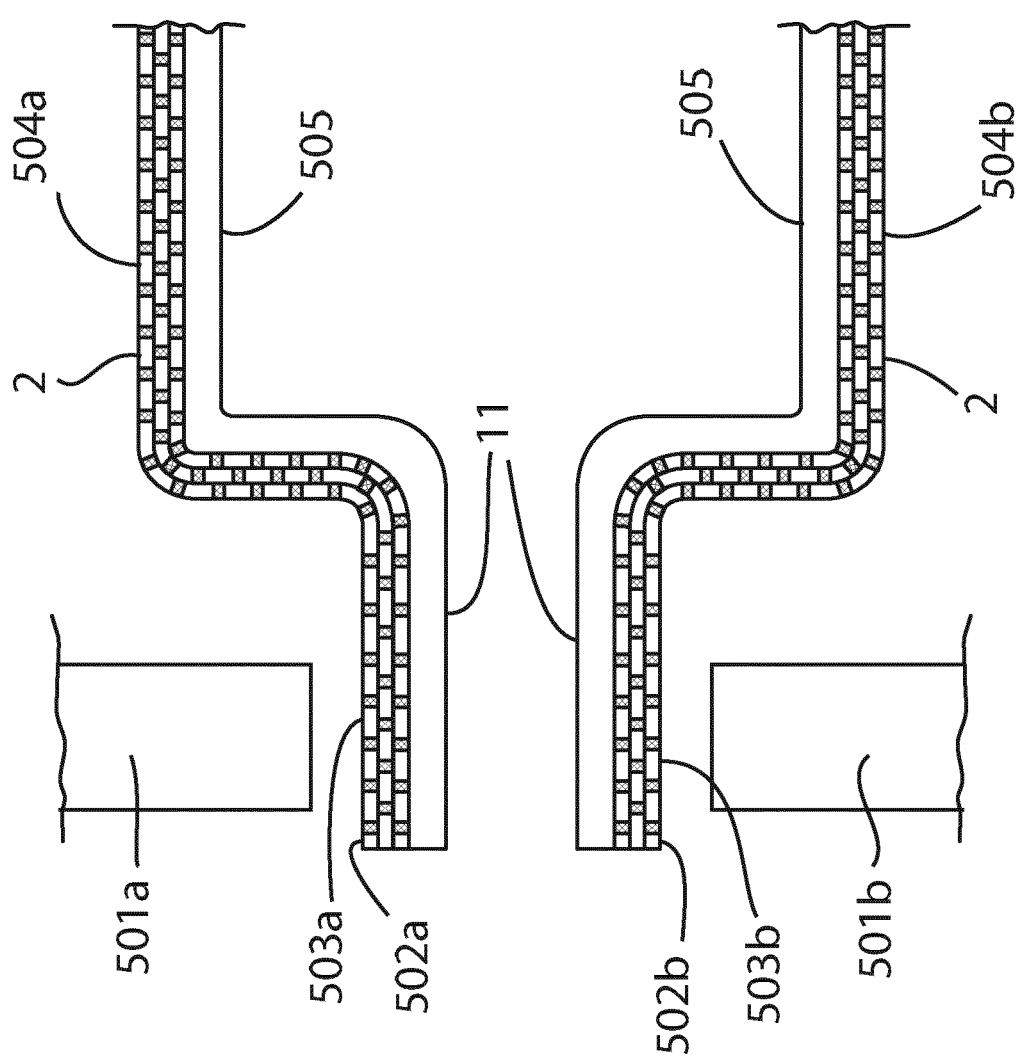

VACUUM INSULATION PANEL

CROSS-REFERENCE TO RELATED APPLICATIONS

This application is a continuation of International Application No. PCT/EP2017/075212, filed Oct. 4, 2017, which claims priority to Great Britain Application No. 1617399.9, filed Oct. 13, 2016. The disclosures of the above applications are incorporating herein by reference.

FIELD

The present disclosure relates to vacuum insulation panels (VIPs) and methods of manufacture thereof.

BACKGROUND

VIPs are used in many insulation applications including in insulation of buildings and in other applications such as refrigeration units and the like. Such panels generally have a panel of insulation material which forms an insulation "core" which is enveloped or wrapped in an envelope. The envelope is evacuated and sealed to provide a vacuum insulation panel.

The core is formed of any suitable material and is typically microporous. For example it may be formed from a particulate matter including powders and fibres and blends thereof. For example it may be formed of particulate silica, for example fumed silica and/or precipitated silica optionally with reinforcing fibres.

Opacifiers, such as infra-red opacifiers can be used within the core.

The core is typically wrapped in a flexible, gas-tight envelope to which a vacuum is applied before sealing.

Thermal conductivity properties of VIPs are typically of the order of about 0.005 W/(m·K).

All thermal conductivities values referenced herein are those determined under BS EN: 12667:2001 unless expressly indicated otherwise. All thermal conductivity values expressed herein are measured in Watts (or milliwatts) per meter Kelvin.

When referring to the present disclosure, the term microns is the SI unit micrometres.

Notwithstanding the various VIP products that are available it is desirable to provide an alternative construction of VIP; an alternative method of making a VIP and/or a VIP with improved properties.

Some of the considerations that are taken into account when constructing a VIP are ease of manufacture, robustness of handling, availability and cost of materials, initial thermal conductivity value, and aged thermal conductivity value.

In relation to thermal conductivity there are many factors including the conductivity of the core and the conductivity of the envelope that influence the overall thermal conductivity of a VIP. The thermal conductivity of the core and of the envelope in turn depend on many other factors.

EP2607073 describes a VIP with a composite core material formed of glass fiber wool and glass fiber board and an outer skin material having a layered structure with a surface protective layer, a metal barrier layer, and a bonding layer from the outside to vacuum-package the core material. The object of EP2607073 is to provide a VIP that exhibits a long-term durability of 10 years or more. However, despite starting from an initial thermal conductivity of approximately 2.4 mW/(m·K), the predicted thermal conductivity after 2 years was approximately 6.4 mW/(m·K). By incorporating a glass fiber board, although the initial thermal conductivity is satisfactory, the lifetime of the board decreases rapidly over time. Notwithstanding the state of the art, there remains a long felt, yet unmet need to provide VIPs with improved thermal conductivity and a long-term durable lifetime. It is known that the thermal conductivity of a VIP product may be improved by reducing the density of the core, which has the added benefit of reducing the production cost of the VIP. However, a reduced density core is less robust and more prone to breakage and thus is more difficult to handle during the various production stages.

Thus, while it is desirable to reduce the density of the core as much as possible in order to improve thermal performance, the more the density is reduced, the more compromised are the handling properties of the core and any VIP made from it.

For example, conventional VIPs made from powder insulation silica cores with core density values of lower than about 165 kg/m$^3$ have poor dimensional stability, the edges of the panels collapse and the panel envelope wrinkles. The result is an inferior product, that tends to warp over time and has an aesthetically displeasing appearance. A balance must therefore be struck between thermal performance and dimensional integrity on the one hand and ease of handling, on the other hand. Once the VIP has been made, it cannot be cut, so dimensional stability of the finished product is crucial.

One of the main problems for improving the longevity of VIPs is ingress of moisture and/or air through the envelope over time. One solution to the problem has been to increase the thickness of envelopes surrounding the core. While increasing the thickness of an envelope reduces its permeability to ingress of moisture and/or air, conduction through the envelope, in particular about the sides of the VIP is increased. Thermal bridging at the edges of a VIP decreases the insulating efficacy of the VIP because the envelope will have greater thermal conductivity than the core.

Improving the thermal performance of the core, improving the permeability of the envelope and reducing thermal bridging effects, is desirable, however, improvement of one property can often have a deleterious effect on other properties. Improving the thermal performance of VIPs and increasing their longevity, will augment their functionality, and increase their suitability for wider application.

SUMMARY

In one aspect, the present disclosure provides a vacuum insulation panel comprising:

(a) a porous insulating core having an upper surface and a lower surface and sides;

(b) an envelope about the core arranged to envelop the core, and to maintain an applied vacuum within the envelope; and (c) a non-foam polyurethane coating layer applied to the envelope, wherein the coating layer is formed over the entire (external) surface area of the envelope.

Advantageously, the presence of the non-foam polyurethane coating layer applied to the entire exterior of the envelope provides the envelope with a waterproof barrier. The coating is continuous over the entire surface of the envelope. Thus there are no discontinuities, such as voids or gaps in the coating. The coating also reduces susceptibility of the vacuum insulation panel to damage, in storage, in transit, during installation and throughout the lifetime of the panel. This results in enhanced vacuum retention, and increases the longevity of the envelope and thus the VIP itself.

Suitably, the envelope comprises a metalized film, preferably, the envelope comprises a plurality of metalized films, for example, the envelope may comprise 3 or more metalized films bonded together to form a laminate. Advantageously, envelopes comprising metalized films have reduced thermal edge effects (thermal bridging at the edges past the core) in comparison to traditional aluminum envelopes.

Suitably, the polyurethane coating layer is less than about 5 mm thick. This advantageously ensures that the thickness of the VIPs is not significantly increased, thereby maintaining their utility in applications such as in refrigerators, while concomitantly increasing their longevity.

The polyurethane coating layer may be at least about 0.05 mm thick, for example from about 0.1 mm to about 3 mm thick, such as from about 0.1 mm to about 1.5 mm thick.

Suitably the polyurethane coating layer has a thickness of from about 0.1 mm to about 3 mm, and has a vapour resistance of from about 10 MN·s/g to about 100 MN·s/g, for example the polyurethane coating layer may have a vapour resistance of about 14 MN·s/g or more for a coating thickness of about 0.5 mm to about 3 mm. Suitably, the polyurethane coating layer may have a vapour resistance of 70 to 100 MN·s/g, such as about 70 MN·s/g or about 80 MN·s/g or about 90 MN·s/g, for a polyurethane coating layer having a thickness of from about 0.5 mm to about 3 mm.

The polyurethane coating layer may have a vapour resistivity of 5000 MN s/gm to about 100,000 MN·s/gm, suitably the polyurethane coating layer has a vapour resistivity of about 7000 MN·s/gm or more. For example the vapour resistivity may be about 6000 MN·s/gm to 10000 MN·s/gm, or about 10,000 MN·s/gm to 100,000 MN·s/gm, or about 20,000 MN·s/gm to 90,000 MN·s/gm, or about 30,000 MN·s/gm to 80,000 MN·s/gm or about 40,000 MN·s/gm to 70,000 MN·s/gm. Advantageously, the polyurethane coating increases the robustness of the vacuum insulation panel, by acting as a waterproof coating about the entire surface of the envelope of the vacuum insulation panel. This reduces the panel's susceptibility to permeation from moisture, for example, rainwater in transit, or condensation when in storage or in use, and also provides a barrier to corrosive substances such as corrosive acid, which may for example leach from other insulation materials such as foams in close proximity to the vacuum insulation panel.

The polyurethane coating layer may be formed from a polyurethane resin composition. The composition may be applied in any suitable manner, such as by coating, for example by dip coating, curtain coating, by brushing or spraying the entire vacuum insulation panel with a suitable polyurethane resin composition.

Suitably, the polyurethane coating layer is formed from a polyurethane resin composition. The polyurethane resin composition may be a two-part composition comprising a first isocyanate containing part and a second polyol containing part. The isocyanate containing part may have a viscosity of from about 2000 mPa·s to about 3000 mPa·s when measured at 20° C. The polyol containing part may have a viscosity of from about 2000 mPa·s to about 3000 mPa·s when measured at 20° C. Suitably, the isocyanate containing part and the polyol containing part each have a viscosity of 2000 to 2500 mPa·s when measured at 20° C., such as about 2300 mPa·s when measured at 20° C. This facilitates easy application of the resin to the VIP envelope.

Suitably, the resin cures quickly, once applied to outer surface of the envelope, to provide a waterproof coating layer about the envelope.

The resin should be compatible with the barrier envelope and not result in corrosion of the barrier envelope.

The envelope and the polyurethane coating layer together form a barrier layer about the insulating core of the vacuum insulation panel. The barrier layer may have a moisture vapour transmission rate (MVTR) of from about $1.5 \times 10^{-3}$ g/m$^2$·day to about $3.0 \times 10^{-3}$ g/m$^2$·day, preferably about $2.5 \times 10^{-3}$ g/m$^2$·day or less, when measured in accordance with ASTM F1249-90. The barrier layer may have an oxygen transmission rate (OTR) of from about $2 \times 10^{-3}$ cc/m$^2$·day to about $5 \times 10^{-3}$ cc/m$^2$·day, preferably about $4 \times 10^{-3}$ cc/m$^2$·day or less, when measured in accordance with ASTM D3985. Preferably, the MVTR is less than $2.5 \times 10^{-3}$ g/m$^2$·day and the OTR is less than $4 \times 10^{-3}$ cc/m$^2$ day.

Advantageously, the presence of the polyurethane layer significantly increases the robustness of the vacuum insulation panel. This ensures that from the time of manufacture to the time of installation and throughout their lifetime, vacuum insulation panels according to the present disclosure are less likely to be accidentally perforated and permeation of moisture and air into the envelope is significantly reduced.

The insulating core may be constructed from a microporous insulating material further details of which are provided below.

The vacuum insulation panel may further comprise at least one reinforcing member arranged on the upper or lower surface of the insulating core to reinforce the core, wherein the reinforcing member is formed of a porous material, and is substantially rigid; wherein together the at least one reinforcing member and the insulating core form a hybrid core and the reinforcing member(s) do not form a thermal bridge across the insulating core; and wherein the envelope is arranged to envelop the hybrid core.

The vacuum insulation panels of the present disclosure may comprise an upper reinforcing member arranged on the upper surface of the insulating core and having a lower reinforcing member arranged on the lower surface of the insulating core.

The at least one reinforcing member comprises an upper surface, a lower surface and sides. The upper and lower surfaces each are significantly larger in surface area than the sides of the reinforcing member. The upper surface and the lower surface of the reinforcing member are the major surfaces of the reinforcing member. Suitably, the reinforcing member is a sheet of porous material. The at least one reinforcing member may have a density that is lower than that of the insulating core. Suitably, the reinforcing member is a cellular material, for example a foam. The reinforcing member may for example be a sheet of polyurethane foam, such as a substantially open cell polyurethane foam.

Advantageously, use of the at least one reinforcing porous member to reinforce the insulating core, enables the manufacture of a reduced density hybrid core, comprising a reduced density insulating core. In the absence of the at least one reinforcing member, the reduced density insulating core by itself does not have sufficient handling strength to be formed into a VIP. In the absence of the at least one reinforcing member the structural integrity of a VIP formed from such a reduced density insulating core is poor. For example VIPs comprising such a reduced density insulating core, in the absence of the at least one reinforcing member, partially collapse, and increased wrinkling is observed in the envelope of said VIPs when vacuum is applied. Furthermore, due to the aforementioned partial collapse of the core, any square sides of a panel are not retained. Loss of structural integrity renders the VIPs unsuitable for close packing, because their sides become irregular and there are significant gaps between VIPs even when they are arranged side by side in abutment.

A conventional VIP with a silica insulating core has a thermal conductivity (lambda value) of approximately 5.0 mW/(m·K). In contrast VIPs with the hybrid core of the present disclosure have a thermal conductivity of about 3.0 mW/(m·K) to about 4.0 mW/(m·K); desirably VIPs of the present disclosure have a thermal conductivity value of about 3.5 mW/(m·K) or less such as about 3.2 mW/(m·K) or less.

Suitably, the at least one of the reinforcing members has a compressive strength of from about 95 kPa to about 150 kPa. The presence of a reinforcing member having a compressive strength of from about 95 kPa to about 150 kPa, facilitates the use of an insulating core of reduced density when compared with traditional VIP insulating cores. Overall the result is a VIP with enhanced thermal performance and an improved aesthetic appearance.

Within the hybrid core, the density of the at least one reinforcing member is desirably lower than that of the insulating core. VIPs of the disclosure comprising a plurality of reinforcing members, for example in embodiments having an upper reinforcing member and a lower reinforcing member, the upper reinforcing member and the lower reinforcing member may each have a density that is lower than that of the insulating core. While the reinforcing member may have a density that is higher than that of the insulating core, as forming a VIP having a reduced density core is desired, preferably, the reinforcing member has a density that is lower than that of the insulating core. In other embodiments one of the reinforcing members may have a density that is higher than that of the insulating core. Optionally one reinforcing member will have a density that is higher than that of the insulating core and a second reinforcing member will have a density that is lower than that of the insulating core.

The reinforcing member is a vacuum stable porous material. The reinforcing member may be formed of a rigid porous material having an average pore size of from about 20 micron to about 200 micron. For example, the average pore size may be about 50 micron to about 200 micron, or about 50 micron to about 150 micron, or about 100 micron to about 200 micron.

Suitably, the reinforcing member may be formed from a rigid microporous material. The reinforcing member may be formed from polyurethane. The reinforcing member may be a foam. The reinforcing member may be formed from polyurethane (PU), polyisocyanurate (PIR), polyethylene (PE), polyethylene terephthalate (PET) or polyphenolic (PP) or combinations thereof. For example, the reinforcing member may be formed from polyurethane (PU), polyisocyanurate (PIR), polyethylene (PE), polyethylene terephthalate (PET) or polyphenolic (PP) foams or combinations thereof. The reinforcing member may be formed from mixed polymeric foams.

Suitably, a VIP of the disclosure, comprises at least one reinforcing member formed of polyurethane. A VIP of the disclosure may comprise an upper reinforcing member and a lower reinforcing member, wherein each reinforcing member is formed of polyurethane. Desirably a polyurethane foam is used.

In general the reinforcing member has a density of between about 30 kg/m³ to 80 kg/m³. The reinforcing member is a rigid microporous material. The average pore size of the porous material from which the reinforcing member is constructed is generally lower than about 150 micron in diameter. For example, the average pore size of the porous material from which the reinforcing member is constructed may be lower than about 140 micron in diameter, or lower than about 130 micron in diameter, or lower than about 120 micron in diameter or lower than about 110 micron in diameter or lower than about 100 micron in diameter. The small pore size contributes to the longevity of the VIP, notably, the smaller the pore size the longer the lifetime of the VIP. Accordingly, materials having larger pore size, are not suitable as reinforcing members in the present disclosure. Materials having an average pore size typically larger than about 250 micron are not suitable as reinforcing members in the present disclosure.

The reinforcing member may be a substantially open celled foam material. The foam may have an open cell content of greater than about 90%. (This is a based on a porosity determination measuring the accessible cellular volume. The remaining % of the volume is made up of closed cells and cell walls). For example, the reinforcing member may be a polyurethane foam with an open cell content of greater than about 90%.

Within a hybrid core, the reinforcing member must be sufficiently strong to support the insulating core, such that when the hybrid core is being conveyed on conveyer belts during manufacture, the integrity of the hybrid core is maintained. Hence, when the hybrid core is conveyed between two conveyer belts having a gap therebetween, the gap being less than the length and/or width of the hybrid core, the reinforcing member must be sufficiently strong to support the insulating core.

The insulating cores utilized in conventional VIPs, such as those constructed from a material comprising powdered insulating material, for example fumed silica have core densities in the range of from about 170 to about 200 kg/m³. The resulting thermal conductivity of conventional VIPs ranges from about 4.0 mW/(m·K) to about 5.0 mW/(m·K).

A VIP of the present disclosure, for example wherein the insulating core comprises silica, such as fumed silica and/or precipitated silica, can achieve a core density of about 100 kg/m³ to about 165 kg/m³, for example about 110 kg/m³ to about 165 kg/m³, or about 110 kg/m³ to about 160 kg/m³, or 120 kg/m³ to about 160 kg/m³ or 130 kg/m³ to about 160 kg/m³, or about 100 kg/m³ to about 140 kg/m³, or about 100 kg/m³ to about 135 kg/m³, or about 100 kg/m³ to about 120 kg/m³. Hence, the incorporation of the reinforcing member into the VIP, facilitates a reduction by up to about 25% of the insulating core density in comparison to insulating cores employed in standard VIPs, which corresponds to about a 13% improvement in thermal performance of the VIP overall.

The density of the insulating core within VIPs of the present disclosure may be of from about 100 kg/m³ to about 165 kg/m³. Optionally the density of the insulating core within VIPs of the present disclosure is of from about 130 kg/m³ to about 160 kg/m³. For example, the density of the insulating core within VIPs of the present disclosure may be from 110 kg/m³ to 160 kg/m³; or from 130 kg/m³ to 160 kg/m³; or from 128 kg/m³ to 162 kg/m³; or from 132 kg/m³ to 157 kg/m³; or from 128 kg/m³ to 162 kg/m³ or from 132 kg/m³ to 157 kg/m³, or from 100 kg/m³ to 150 kg/m³, or from 100 kg/m³ to 140 kg/m³, or from 100 kg/m³ to 135 kg/m³, or from 100 kg/m³ to 120 kg/m³.

The insulating core may comprise silica, such as fumed silica and said insulating core may have a density of from about 100 kg/m$^3$ to about 160 kg/m$^3$. Optionally, the insulating core may have a density of from about 120 kg/m$^3$ to about 150 kg/m$^3$.

The at least one reinforcing member may comprise polyurethane and the insulating core may comprise fumed silica and said insulating core has a density of from about 100 kg/m$^3$ to about 160 kg/m$^3$, optionally the density may be of from about 120 kg/m$^3$ to about 150 kg/m$^3$.

The at least one reinforcing member may comprise a metal foil facer, said metal foil facer having a thickness of from 4 microns to 50 microns, and extending across substantially the entire surface of the reinforcing member, on the upper surface or lower surface thereof and wherein the metal foil facer does not form a thermal bridge between the upper surface and lower surface of the reinforcing member.

Advantageously, the presence of the metal foil facer on the reinforcing member increases the barrier to permeation of moisture and gas into the insulating core.

Vacuum insulation panels disclosed herein whether comprising a hybrid core as described above or an insulating core absent reinforcing members, may comprise at least one metal foil having a thickness of from 4 microns to 50 microns, between the envelope and the insulating core and extending across substantially the entire surface of the insulating core on the upper surface or lower surface thereof and wherein the foil does not form a thermal bridge between the upper surface and lower surface of the insulating core. Suitably, the metal foil is attached to the inside of the envelope.

The envelope may comprise an envelope inner layer and the metal foil may have at least one outer layer attached thereto and the envelope inner layer and the outer layer on the metal foil may be attached to each other being optionally bonded to each other.

The vacuum insulation panels disclosed herein may comprise two metal foils having a thickness of from 4 micron to 50 micron wherein one metal foil extends across substantially the entire upper surface of the insulating core and a second metal foil extends across substantially the entire lower surface of the insulating core. Such a configuration is particularly suited to vacuum insulation panels for use in refrigerator panels, wherein a barrier to permeation for both major surfaces of the vacuum insulation panel is particularly advantageous.

The metal foil disposed between the insulating core and the envelope, whether present as a metal facer on a reinforcing member or otherwise, improves the permeation rate through the envelope. This means that air (gas) ingress into the envelope over time is reduced considerably with consequent improvement in the aged thermal conductivity of the VIP. The applied vacuum is maintained over a longer period of time. Maintenance of the vacuum over time means that the performance of the VIP from a thermal conductivity point of view is maintained for a longer period. This means that the useful lifetime of the VIP is improved.

The presence of metal foil as a metal facer on a reinforcing member advantageously facilitates a decrease in core density and a decrease in permeation through the envelope thereby enhancing the overall thermal insulation performance of the VIPs of the present disclosure.

In particular the present disclosure provides an envelope for the core that has improved permeation properties. In this context improved permeation is in fact reduced permeation because the lower the permeation the better, from the stand point of maintaining a vacuum within the envelope. Reduced permeation of air (gas) into (through) the envelope over time results in an improved VIP performance.

The metal foil having a thickness of from 4 microns to 50 microns, such as from about 8 to 16 microns, will have a greater thermal conductivity than materials typically used for constructing a VIP envelope. For that reason it is important that a vacuum insulation panel of the disclosure will be constructed so that there is no thermal bridge formed by the metal foil that allows heat to be conducted past the core by bypassing the insulating core. If the metal foil were to extend beyond the upper surface (about the sides of the panel) and towards the lower surface (or vice versa) then the possibility of forming a thermal bridge increases with the consequent loss in performance in terms of thermal conductivity. From an insulation standpoint the lower the thermal conductivity of the panel the better. Thus whether the metal foil is present in the VIP as a metal foil facer on a reinforcing member or otherwise (i.e. the metal foil is simply provided across a major core surface), in neither embodiment, will the metal foil form a thermal bridge across the insulating core, i.e. from one major surface of the insulating core to the diametrically opposed other major surface of the insulating core.

The insulating core may have a parallelepiped or cuboid shape, comprising an upper surface, a lower surface and sides. The upper and lower surfaces (i.e. the major surfaces) are of larger surface area than the sides. The upper and lower surfaces are diametrically opposed surfaces. The metal foil is in direct contact with the core. The core may be encased in an air permeable cover or sleeve and the skilled person will appreciate that in such a case the metal foil is in direct contact with the sleeve encasing the core. The metal foil is not sandwiched between layers of the envelope. Specifically, the metal foil is not sandwiched between layers of the envelope, which form a thermal bridge about the core.

The metal foil layer has an inner surface and an outer surface. As outlined above, the metal foil is disposed between the inner surface of the envelope and the core, for example between the envelope and an upper (or lower) surface of the core. The metal foil itself has an inner surface and an outer surface, and the inner surface of the metal foil is proximate the core, while the outer surface of the metal foil is proximate the inner surface of the envelope.

The metal foil does not form a thermal bridge between the upper and lower surfaces. In particular there will be no thermal bridge formed by the metal foil. For example, the metal foil will not extend about the sides of the insulating core. Instead, the metal foil will be located only on the upper and/or lower surface of the insulating core. It will not bridge across the insulating core.

This means that any diminution in the overall thermal conductivity performance of the vacuum insulation panel which results from using the metal foil is not further compromised by a thermal edge effect with heat transfer through a thermal bridge which bypasses the core.

The present inventors have thus discovered that it is possible to have a construction where the overall aged thermal performance of the vacuum insulation panel is improved despite the use of metal foil(s) that have inferior thermal insulation performance, in comparison to the insulating core or the envelope, since the metal foil will be a far better thermal conductor than the insulating core or the envelope.

In particular, the inventors have discovered that it is possible to reduce air (gas) permeation through the envelope to an extent that it improves aged thermal performance, despite the use of a metal foil with a thermal conductivity that would typically be deemed unsuitable for use in VIPs as higher conductivity materials are traditionally considered to diminish thermal insulation performance.

This reduction in air (gas) permeation and resultant improvement in aged thermal insulation performance is accomplished by having an envelope that surrounds the core and having a metal foil that is only present on the upper and/or lower surface of the core.

The metal foil is attached to the inside of the envelope. Typically this is done after the vacuum is applied. The metal foil may be bonded to the inside of the envelope after a vacuum has been applied and after the VIP is formed. This may be achieved for example by heating the entire VIP in an oven. This step is conducted prior to coating the VIP with the non-foam polyurethane coating.

In a vacuum insulation panel of the disclosure the envelope comprises an inner layer and the metal foil has at least one outer layer attached thereto wherein the envelope inner layer and the outer layer on the metal foil are attached to each other being optionally bonded to each other. In this context inner is with respect to the panel construction and in particular the core. So an inner layer on the envelope is on the side (e.g. of the envelope) that faces inwardly towards the core and an outer layer is on a side (e.g. of the metal foil) that faces outwardly away from the core.

As will be appreciated in order to minimize permeation, it would be desirable to have a permeation barrier across the entire envelope. It would be desirable that the permeation barrier surrounds the entire core.

In this respect VIPs that are already on the market have been constructed to be resistant to permeation. For example it is typical for a VIP to have an envelope constructed of a metalized film formed from a polymer film coated with one or more metalized layers. For example metalized PET (metalized polyethylene terephthalate) has been used to construct an envelope. Metalized films are constructed by applying a metal to a polymeric film, for example by applying the metal via a metal deposition technique on the desired film and the metalized layer of the metalized film is typically of the order of nanometres (in thickness). For example such a metalized layer may be of the order of 10 to 30 nm for example about 18 nm (thick). The metalized film (which comprises a polymer film coated with typically one or more metalized layers) is often of the order of 5 to 20 microns in thickness, for example about 12 microns in thickness. (This is the thickness of the polymer film and the metalized layer(s) taken together.) Often the metal used is aluminum.

As outlined above metalized film for example metalized PET can be used to create an envelope for a VIP. A metalized PET film, comprises a film of polyethylene terephthalate coated with at least one thin layer of metal (i.e. a metalized layer). To create a VIP a number of layers each layer being a metalized film, such as a PET metalized film of the type described above, can be used to create the envelope. In such cases the metalized film is formed as a laminate. The metalized layers may be attached to an inner envelope layer of for example polyethylene (PE). Other suitable inner envelope inner layers include low density polyethylene (LDPE) e.g. linear low density polyethylene (LLDPE), and ultra-high molecular weight polyethylene (UHMWPE); polypropylene and ethylenevinyl alcohol (EVOH), polyvinylidene chloride (PVDC); thermoplastic urethanes; including combinations thereof including copolymers and blends thereof.

In any event, the material forming the envelope is wrapped around the core and the envelope is then sealed to itself. This may be done by the application of heat around the edges of the envelope, for example by catching two edges of the envelope material between heating jaws and then applying pressure and heating to seal the material into an envelope. A vacuum is then applied and the position on the envelope where the vacuum is applied is finally sealed also to form a vacuum retaining envelope.

When an envelope is constructed in this way, by folding a material upon itself and heat sealing it about the edges to form the envelope, the same material is used throughout the envelope. In particular, in the case of an envelope constructed from one or more metalized layers, the metalized film extends across the entire inner surface of the envelope. In particular, it extends across the upper surface, across the lower surface, and across the sides and thus bridges between the upper and lower surfaces.

The metal foil layer used in vacuum insulation panels of the present disclosure can be used in conjunction with such an envelope construction. However, as mentioned above the metal foil layer of the present disclosure will not extend across the sides of the insulating core and will not bridge between the upper and lower surfaces of the core. Achieving such a construction according to the disclosure can be accomplished using the method of the disclosure as set out below.

In the arrangement described, the inner layer on the envelope and the outer surface of the metal foil are arranged proximate each other. The inner surface of the envelope and the metal foil may initially be provided separately and then later be joined. Typically the outer layer on the metal foil is provided across substantially the entire surface area of the upper and/or lower surface of the metal foil. As the metal foil corresponds substantially in surface area with the upper and/or lower surface of the core, this means that the metal foil is held on the inside of the envelope and in a position at which it aligns substantially with the upper and/or lower surface of the core. The metal foil does not extend from the upper and/or lower surface about the sides of the core.

Desirably the at least one metal foil is a rolled metal. The metal foil will be capable of being handled by itself. It is self-supporting and does not have to be provided on a support, albeit in some embodiments the metal foil may be provided as a facer on a reinforcing member as described above. For convenience, and in particular for ease of attachment to the envelope, a layer may be provided on the metal foil, for example a layer may be provided at least on an outer surface thereof. That layer will be compatible with a layer of the envelope in order that the two layers may then be joined, for example by heating. Optionally, the layer provided on the outer surface of the metal foil is a polymer layer.

It will be appreciated that even though the material forming the envelope is edge sealed in order to form the envelope, this edge sealing will not join the metal foil to the envelope because the metal foil does not extend about the sides of the envelope. Instead the metal foil is attached to the envelope in a subsequent manufacturing step as will be described in more detail below.

The metal foil may be formed of a suitable metal, including combinations such as alloys. Suitable metals include aluminum and steel for example stainless steel. Desirably the thickness of the at least one metal foil is of from 4 micron to 50 micron, or of from 4 micron to 30 micron, or of from 4 micron to 20 micron, or of from 4 micron to 18 micron, or of from 4 micron to 16 micron, or of from 4 micron to 14 micron, or of from 4 micron to 12 micron, or of from 6 micron to 20 micron, or of from 6 micron to 18 micron, or of from 6 micron to 16 micron, or of from 6 micron to 14 micron, or of from 6 micron to 12 micron, or of from 8 micron to 20 micron, or of from 8 micron to 18 micron, or of from 8 micron to 16 micron, or of from 8 micron to 14 micron, or of from 8 micron to 12 micron.

Within the disclosure the at least one metal foil may be rolled aluminum for example rolled aluminum having a thickness of about 12 micron.

Desirably a vacuum insulation panel of the disclosure comprises two metal foils, wherein one metal foil extends across substantially the entire surface of the core on the upper surface and a second metal foil extends across substantially the entire surface of the core on the lower surface.

Desirably a metal foil extends across at least 80%; such as at least 85%; for example at least 90% for example at least 95% of an upper or lower surface of the core.

Within the disclosure an inner layer of the envelope may comprise a thermoplastic material which softens sufficiently to be heat sealed. The softening occurs at a temperature lower than the temperature at which the integrity of the envelope is compromised.

The thermoplastic material may be selected from the group consisting of polyethylene including low density polyethylene (LDPE) e.g. linear low density polyethylene (LLDPE), and ultra-high molecular weight polyethylene (UHMWPE); polypropylene and ethylenevinyl alcohol (EVOH), polyvinylidene chloride (PVDC); thermoplastic urethanes; including combinations thereof including copolymers and blends thereof.

Any suitable grade of material may be utilized. These include plasticized grades, flame retardant grades and combinations thereof.

Where an outer layer is provided on the metal foil the outer layer may comprise a thermoplastic polymer selected from the group consisting of polyethylene, polypropylene and ethylenevinyl alcohol or copolymers thereof.

An outer layer is provided on the metal foil and an inner layer is provided on the envelope and the outer layer on the metal foil and the inner layer on the envelope are bonded by heating the panel.

It is desirable that the metal foil attaches across substantially its entire surface area to the inside of the envelope. For example, when attached, the envelope and the metal foil may effectively form a laminate structure. The metal forms the innermost layer of said laminate structure. The skilled person will appreciate that the metal foil is proximate the core. The metal foil is not sandwiched between layers of plastic which form a thermal bridge about the core.

The inner layer of the envelope may comprise a polyethylene material such as a polyethylene film and the outer layer on the metal foil may comprise a polyethylene material such as a polyethylene coating.

The inner layer of the envelope which attaches to the metal foil may have a thickness in the range from about 10 to about 50 microns. The outer layer of the metal foil which attaches to the envelope may have a thickness in the range from about 10 to about 50 microns.

As mentioned above, the metal foil may be attached to a layer, and the layer may be attached to the outer surface of the metal foil. The layer may be typically a polymer layer. The layer is a thermoplastic polymer layer. The layer is attached to the metal foil by any desired method including utilizing adhesive. The layer attached to the metal foil, may for example be polyethylene (PE). In such a case, the metal foil may form part of a laminate structure. Whether in a laminate structure or not, the metal foil will not be directly (or indirectly) attached to the inner surface of the envelope until after the vacuum is applied. Optionally, a layer may also be attached to the inner surface of the metal foil. This layer is typically a polymer layer, optionally a thermoplastic polymer layer and said layer may be attached to the metal foil by any desired method including utilizing adhesive. This inner layer on the metal foil does not extend about the sides of the core. For example, the metal foil inner layer does not form a thermal bridge between the upper surface of the core and the lower surface of the core. The inner layer may be substantially the same size as the metal foil, suitably, the inner layer on the metal foil is the same size as the metal foil.

Suitably, the envelope comprises a metalized film, for example the envelope may comprise a plurality of metalized films, for example, in a laminate structure. Optionally three metalized films may be provided within a laminate structure. In such an arrangement the metalized side of the film would typically face outwards (towards the exterior of the envelope).

A further layer may be provided as the inner layer of the envelope. Such a layer will typically be a non-metalized layer. As outlined above, the further layer may be a polyethylene layer. Again, the overall structure of the envelope may be provided as a laminate and the envelope is then created from that laminate. The envelope is sealed by edge sealing. However, the metal foil, or any laminate in which the metal foil is incorporated, is not attached to the envelope by the edge sealing process.

The material supporting the metal layers in the metalized film will typically be a polymeric material. It will be selected to have a higher melting point than the inner layer of the envelope. For example the envelope may be constructed of a plurality of layers of metalized PET whereas the inner layer of the envelope may be formed from PE.

Typically PET has a melting point that is greater than that of polyethylene. For example PET may have a melting point that is greater than 250° C. Polyethylene has a melting point typically in the range from about 105 to 180° C. For example low density polyethylene may have a melting point in the range from about 105 to 115° C. For example medium to high density polyethylene may have a melting point in the range from 115 to 180° C.

Typical metalized films have an oxygen transmission rate (OTR) of less than about $2 \times 10^{-3}$ cc/m$^2$ day as measured according to ASTM D3985 (measured at 23° C. with 50% relative humidity) and moisture vapour transmission rates of about 0.02 g/m$^2$ day as measured according to ASTM F1249-90 (measured at 38° C. with 100% relative humidity). In contrast typical aluminum foils have an oxygen transmission rate of less than about $5 \times 10^{-4}$ cc/m$^2$ day measured according to ASTM D3985 (measured at 23° C. with 50% relative humidity) and moisture vapour transmission rates of less than about 0.005 g/m$^2$ day as measured according to ASTM F1249-90 (measured at 38° C. with 100% relative humidity). The aforementioned values are measured for planar film samples and the planar film samples do not have seals such as those found in a VIP envelope.

In a VIP envelope, defects in the envelope barrier material and the presence of an envelope seal lead to a permeation value for the envelope which is higher than a permeation value determined for a planar film sample as utilized according to the above-mentioned standard test methods. The permeation through an envelope is thus generally higher due to permeation through the envelope seals, which do not possess a metallization barrier. The overall oxygen transmission rate through a traditional VIP envelope is typically an order of magnitude higher than that for a planar film, due to the presence of the non-metalized seals; i.e. the oxygen transmission rate through a traditional metalized film VIP envelope is about $20 \times 10^{-3}$ cc/m$^2$ day.

While the OTR for a VIP envelope made of metalized film (e.g. metalized PET) is about $20 \times 10^{-3}$ cc/m$^2$·day, the OTR for a VIP envelope made of aluminum foil is about $5 \times 10^{-3}$ cc/m$^2$·day.

As outlined above, the VIPs of the present disclosure have increased longevity owed to decreased OTR and MVTR. Furthermore, the presence of the non-foam polyurethane coating on the outer surface of the envelope improves the vapour resistivity of the VIP.

The present disclosure also provides a process for manufacturing a vacuum insulation panel comprising the steps of:
(i) providing a porous insulating core having an upper surface and a lower surface and sides;
(ii) providing at least one metal foil having a thickness of at least 4 microns which extends across substantially the entire upper surface or entire lower surface of the core so that the foil does not form a thermal bridge between the upper surface and lower surface of the core;
(iii) providing an envelope having an inside surface and an outside surface, wherein the envelope is arranged to: (i) envelop the core and the metal foil, with the metal foil between the envelope and the core, and (ii) to maintain an applied vacuum within the envelope;
(iv) applying a vacuum to the envelope;
(v) attaching the metal foil to an inside surface of the envelope after the vacuum has been applied; and
(vi) coating the entire external surface of the vacuum insulation panel with a non-foam polyurethane layer.

By completing the attaching step after applying the vacuum, the pressure differential across the envelope (caused by reduced pressure within the envelope due to application of the vacuum) creates a very strong urging force for mating the metal foil to the inside of the envelope. In essence then atmospheric pressure is sufficiently strong to press the envelope against the metal foil and in turn the metal foil against the core. This pressure is sufficient to allow the two separate parts (the metal foil and the envelope) to be joined across their entire mating area.

It will be appreciated that the attaching step can be done after any equipment for applying the vacuum has been removed. That is the attaching step can be carried out when the retained vacuum within the envelope is the only vacuum present. So the attaching step can be done after the VIP has been evacuated and then sealed to retain the vacuum. It is the vacuum within the evacuated and then sealed envelope that is present.

The metal foil will be placed so as to reduce the permeability of the envelope across substantially the entire upper or lower surface area of the core.

Where the envelope comprises an envelope inner layer and the metal foil has at least one outer layer attached thereto the envelope inner layer and the outer layer on the metal foil are attached to each other and are optionally bonded to each other.

Any construction of vacuum insulation panel of the disclosure described herein may be made by the process of the disclosure.

The inner layer of the envelope may comprise a polymer selected from the group consisting of polyethylene, polypropylene and ethylenevinyl alcohol or copolymers thereof.

The outer layer on the metal foil may comprise a polymer selected from the group consisting of polyethylene, polypropylene and ethylenevinyl alcohol or copolymers thereof.

The metal foil and the inside surface of the envelope may be attached to each other by heating the panel (after the vacuum is applied). Suitably, the entire panel is heated in an oven. By heating the entire panel as opposed to simply heating the upper and or lower surface thereof, the edge seal is significantly enhanced.

The metal foil and the inside surface of the envelope may be attached to each other by heating the panel to a temperature of between about 100 and 180 degrees Celsius optionally for approximately 0.5 to 10 minutes.

After heating to a temperature in the range from about 100 and 180 degrees Celsius for approximately 0.5 to 10 minutes, the panel is cooled to ambient temperature within approximately 1 to 15 minutes.

A conventional VIP with an insulating core constructed from a microporous material has a thermal conductivity (lambda value) of approximately 5.0 mW/(m·K). In contrast VIPs of the present disclosure have a thermal conductivity of about 3.0 mW/(m·K) to about 4.0 mW/(m·K); desirably VIPs of the present disclosure have a thermal conductivity value of about 3.5 mW/(m·K) or less such as about 3.2 mW/(m·K) or less.

VIPs of the present disclosure have improved thermal conductivity values, and longer lifetime than traditional VIPs as permeation through the barrier envelope is reduced due to the presence of the at least one metal foil layer within the VIP and damage as a result of exposure to moisture is reduced by the presence of the non-foam polyurethane coating layer applied to the envelope. VIPs of the present disclosure are more robust than traditional VIPs and less susceptible to perforation as a consequence of the additional non-foam polyurethane coating layer.

Furthermore, the seal about the edges of envelope of VIPs of the present disclosure, is substantially stronger and larger than the seal about the edges of a traditional VIP, due to the method of manufacture of the present VIP, which is explained in detail below.

Suitably, the insulating core may be constructed from an insulation material in particulate form. In particular, the insulating core may be constructed from microporous materials such as silica, perlite, diatomaceous earth, fumed silica and combinations thereof.

Optionally the insulating material may be a microporous insulating material with an average particle size of less than about 1 micron in diameter. In general the microporous insulating material has an average particle size of about 20 nm to about 500 nm, for example from about 50 nm to about 500 nm, or from about 50 nm to about 400 nm, or from about 50 nm to about 350 nm, or from about 50 nm to about 300 nm, or from about 100 nm to about 300 nm, or from about 100 nm to about 400 nm. Suitably, the microporous insulating material has an average particle size of less than about 200 nm.

These materials may be mixed with infra-red absorbing materials (IR opacifiers) such as carbon black, titanium dioxide, iron oxides, magnetite or silicon carbide, or combinations thereof.

Accordingly, while the insulation material of the insulating core is primarily composed of microporous materials, there may in addition be smaller percentages (typically 5-20% each) of a fibre binder (which can be polymeric or inorganic) and an infra-red opacifier (e.g. silicon carbide, carbon clack or iron oxide). Neither the fibres nor the opacifier need be microporous and generally they are not microporous.

The insulation material may be a mixture; for example it may comprise fibres which serve to bind the particulate material together (once pressed). The fibres may be of organic or inorganic material. In one case the fibres are polyester or polypropylene fibres.

Suitably, the insulation core comprises powder based insulating material, for example, fumed silica, precipitated silica, perlite, dichotomous earth or combinations thereof. The porous insulating core is constructed from a powder material that is formed into an insulating (microporous) core for example a powder insulating microporous material selected from the group consisting of fumed silica, precipitated silica and perlite, or combinations thereof. Desirably the insulating core comprises fumed silica.

The core may be encased in an air permeable cover or fleece prior to encasing the core and the at least one metal foil layer(s) in the flexible envelope.

For example, the air permeable cover may be selected from non-woven PET fleece or perforated shrink wrap.

The envelope may be constructed of metalized polyethylene terephthalate (PET) laminate. Suitably, the envelope is an aluminum metalized polyester comprising a layer of polyethylene on the aluminum, for example as a laminate. When forming the VIP the layer of polyethylene is within the envelope. The polyethylene layer is employed to seal the VIP once the envelope comprising the core and the at least one metal foil layer(s) is evacuated. The envelope may also be metalized ethylene vinyl alcohol (EVOH), or metalized polypropylene (PP).

In one embodiment the present disclosure provides a vacuum insulation panel comprising:

(a) a porous insulating core having an upper surface and lower surface and sides; wherein said insulating core is formed of a microporous insulating material, selected from the group consisting of fumed silica, precipitated silica, perlite, dichotomous earth or combinations thereof;

(b) an envelope about the core arranged to envelop the core, and to maintain an applied vacuum within the envelope; wherein the envelope is constructed from a metalized polyethylene terephthalate film; comprising an envelope inner layer, the inner layer being constructed from one of polyethylene, ethylene vinyl alcohol, or polyvinylidene chloride;

(c) at least one metal foil having a thickness of from 4 microns to 50 microns, the foil being provided between the envelope and the insulating core and extending across substantially the entire surface of the insulating core on the upper surface or lower surface thereof and wherein the foil does not form a thermal bridge between the upper surface and the lower surface of the insulating core; wherein the metal foil has at least one outer layer attached thereto; wherein the envelope inner layer and the outer layer on the metal foil are attached to each other, being optionally bonded to each other; and (d) a non-foam polyurethane coating layer applied to the envelope wherein the coating layer is formed over the entire surface area of the envelope;

wherein the vacuum insulation panel has thermal conductivity of from 3.0 mW/(m·K) to 4.0 mW/(m·K).

In another embodiment, the present disclosure provides a vacuum insulation panel comprising:

(a) a porous insulating core having an upper surface and lower surface and sides; at least one reinforcing member arranged on the upper or lower surface of the insulating core to reinforce the core, wherein the reinforcing member is formed of a porous material and is substantially rigid; wherein together the at least one reinforcing member and the insulating core form a hybrid core and the reinforcing member(s) do not form a thermal bridge across the insulating core and wherein the envelope is arranged to envelop the hybrid core; wherein the insulating core is formed of a microporous insulating material, selected from the group consisting of fumed silica, precipitated silica, perlite, dichotomous earth or combinations thereof;

(b) an envelope about the core arranged to envelop the core, and to maintain an applied vacuum within the envelope; wherein the envelope is constructed from a metalized polyethylene terephthalate film; comprising an envelope inner layer, the inner layer being constructed from one of polyethylene, ethylene vinyl alcohol, or polyvinylidene chloride;

(c) at least one metal foil having a thickness of from 4 microns to 50 microns, the foil being provided between the envelope and the hybrid core and extending across substantially the entire surface of the hybrid core on the upper surface or lower surface thereof and wherein the foil does not form a thermal bridge between the upper surface and the lower surface of the hybrid core; wherein the metal foil has at least one outer layer attached thereto; wherein the envelope inner layer and the outer layer on the metal foil are attached to each other, being optionally bonded to each other; and (d) a non-foam polyurethane coating layer applied to the envelope wherein the coating layer is formed over the entire surface area of the envelope;

wherein the density of the insulating core within the vacuum insulation panel is from 100 kg/m$^3$ to 150 kg/m$^3$ and wherein the vacuum insulation panel has thermal conductivity of from 3.0 mW/(m·K) to 4.0 mW/(m·K).

In some embodiments, the vacuum insulation panels of the present disclosure may further comprise a layer of adhesive on the outer surface of the panel, for example on the outer surface of the non-foam polyurethane coating. Suitably, the adhesive is a pressure sensitive adhesive layer. The layer of adhesive may have a release substrate attached thereto, which is removed prior to installation of the vacuum insulation panel. Advantageously, the presence of the layer of adhesive facilitates installation of the panel, enabling the user to adhere the panel to a substrate such as a wall, cladding or roof. Suitably, the pressure sensitive adhesive is not a hot melt adhesive.

Advantageously, the VIPs of the present disclosure can be incorporated into shipping containers, pipe insulation, refrigerators, coolers, and in a variety of industrial appliances. Furthermore, the VIPs of the present disclosure are lightweight, more robust than traditional VIPs and can be used in a variety of environments. For example, the VIPs of the present disclosure can be used in cryogenic apparatus and also at elevated temperature (up to 80° C.) without jeopardizing their insulating performance.

DRAWINGS

Embodiments of the disclosure will be described, by way of example only, with reference to the accompanying drawings in which:

FIG. 11 shows a cross-sectional view showing the construction of the metal foil;

FIGS. 12A and 12B show a cross-sectional view depicting the method of sealing the envelope of a vacuum insulation panel;

DETAILED DESCRIPTION

All thermal conductivities values referenced herein are those determined under BS EN: 12667:2001 unless expressly indicated otherwise. All thermal conductivity values expressed herein are measured in Watts per meter Kelvin or milliwatts per meter Kelvin.

All oxygen transmission rate (OTR) values referenced herein are measured according to ASTM D3985 (measured at 23° C. with 50% relative humidity) and all moisture vapour transmission rate (MVTR) values referenced herein are measured according to ASTM F1249-90 (measured at 38° C. with 100% relative humidity).

All vapour resistance vapour resistivity values and vapour resistivity values referenced herein are measured according to standard EN 12086. The unit of vapour resistivity is Mega-Newton seconds per gram-metre, MN·s/gm. The unit of vapour resistance is Mega-Newton seconds per gram.

All viscosity values referenced herein are measured according to standard BS188. The units of viscosity is millipascal second, mPa·s.

Unless otherwise specified compressive strengths are measured as according to BS EN 826: 2013. The unit of compressive strength is the kilopascal, kPa.

Figure 1:
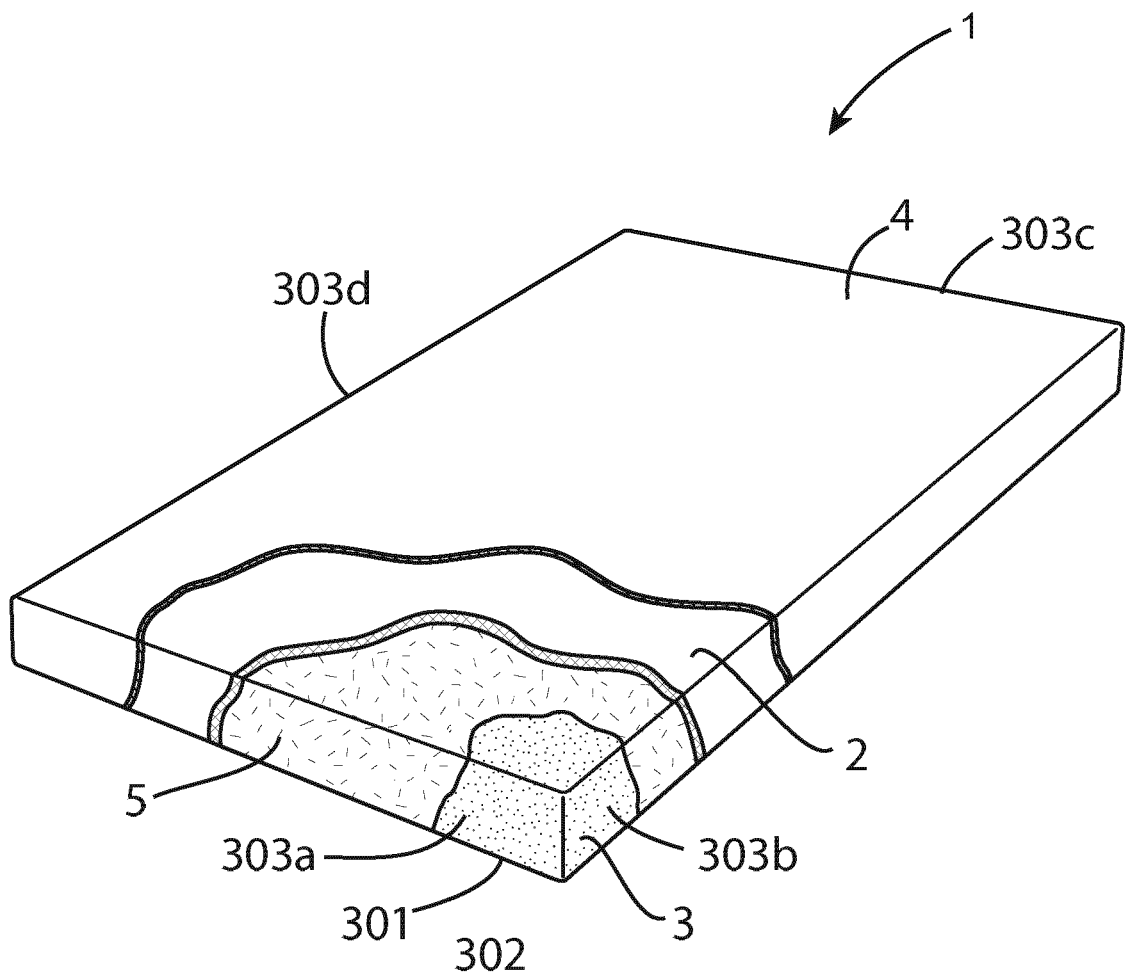
FIG. 1 is perspective cut-away view of a vacuum insulation panel in one aspect of the disclosure.

FIG. 1 is a perspective cut-away view of a VIP 1 according to the present disclosure. FIG. 1 shows a porous insulating core 3, having an upper surface 301 and a lower surface 302 and sides 303a-303d. An envelope 2 about the insulating core 3 is arranged to envelop the core, and to maintain an applied vacuum within the envelope 2. A fleece 5 is shown encasing the insulating core 3. A non-foam polyurethane coating layer 4 is applied to the exterior of the envelope 2. The non-foam polyurethane coating layer is formed over the entire external surface area of the envelope 2.

Figure 2:
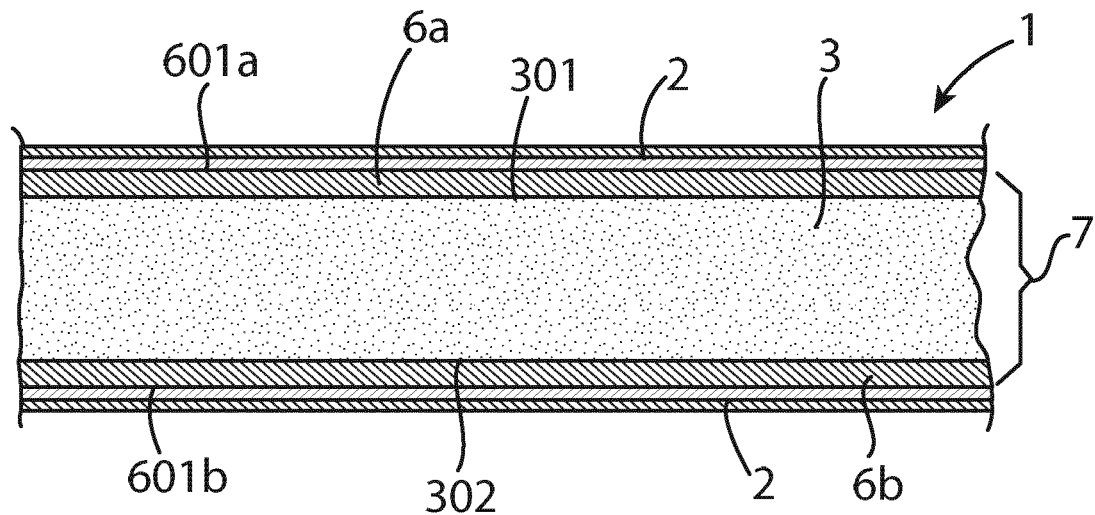
FIG. 2 is a cross-sectional view of a view of a vacuum insulation panel comprising a hybrid core.

FIG. 2 is a cross-sectional view of a VIP 1 of the disclosure. The VIP 1 comprises an insulating core 3 having upper 301 and lower 302 surfaces. The VIP also comprises a reinforcing member 6a of rigid polyurethane arranged on the upper surface 301 of the core 3. A second reinforcing member 6b of rigid polyurethane is arranged on the lower surface 302 of the core 3. The reinforcing members 6a & 6b are suitably constructed from a cellular material, such as a foam. The reinforcing members are porous and have a substantially smooth outer surfaces 601a & 601b. Together the reinforcing members 6a & 6b and the insulating core 3 form a hybrid core 7. The reinforcing members 6a, 6b are arranged so that no thermal bridge is formed across the insulating core 3 i.e. the reinforcing members do not form a thermal bridge between upper surface 301 of the insulating core and lower surface 302 of the insulating core. The upper surface 601a of the upper reinforcing member 6a is substantially smooth as is the lower surface 601b of the lower reinforcing member 6b. The VIP further comprises a barrier envelope 2, optionally constructed from a barrier film, arranged to envelop the insulating core 3 and the reinforcing members 6a, 6b of the hybrid core 7. The barrier envelope 2 is coated with a non-foam polyurethane coating layer, which coats the entire external surface of the envelope. The insulating core comprises microporous fumed silica. The density of the insulating core in this embodiment is 130 kg/m$^3$.

Figure 3:
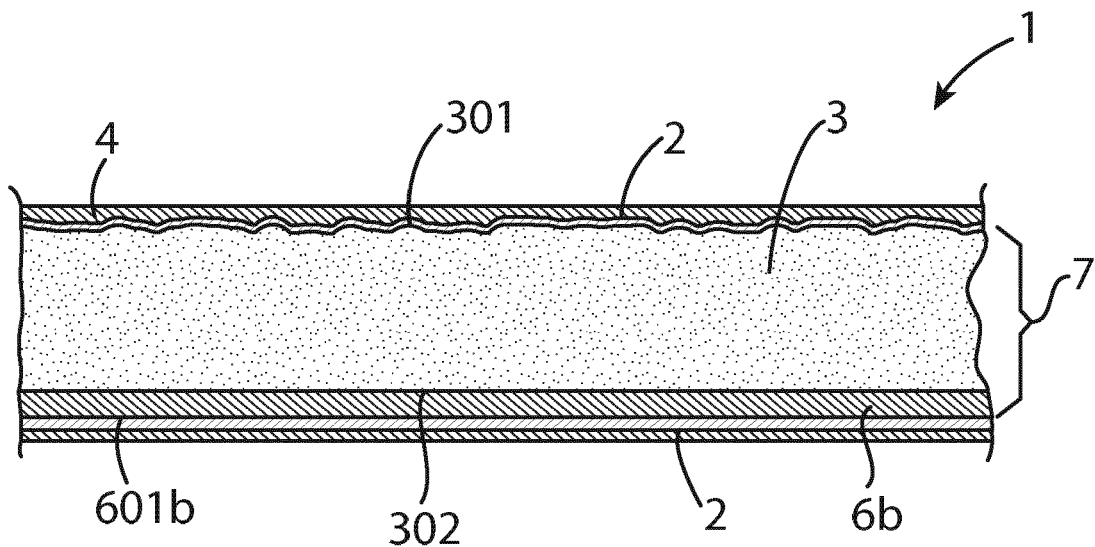
FIG. 3 shows a cross-sectional view of a vacuum insulation panel comprising an alternative hybrid configuration to the vacuum insulation panel of FIG. 2.

FIG. 3 shows an alternative configuration wherein one reinforcing member 6b is present and extends substantially across the entire lower surface 302 of core 3. In this embodiment the reinforcing member 6b and the insulating core 3 together form a hybrid core 7. The insulating core comprises microporous fumed silica. The density of the insulating core in this embodiment is 140 kg/m$^3$.

Figure 4:
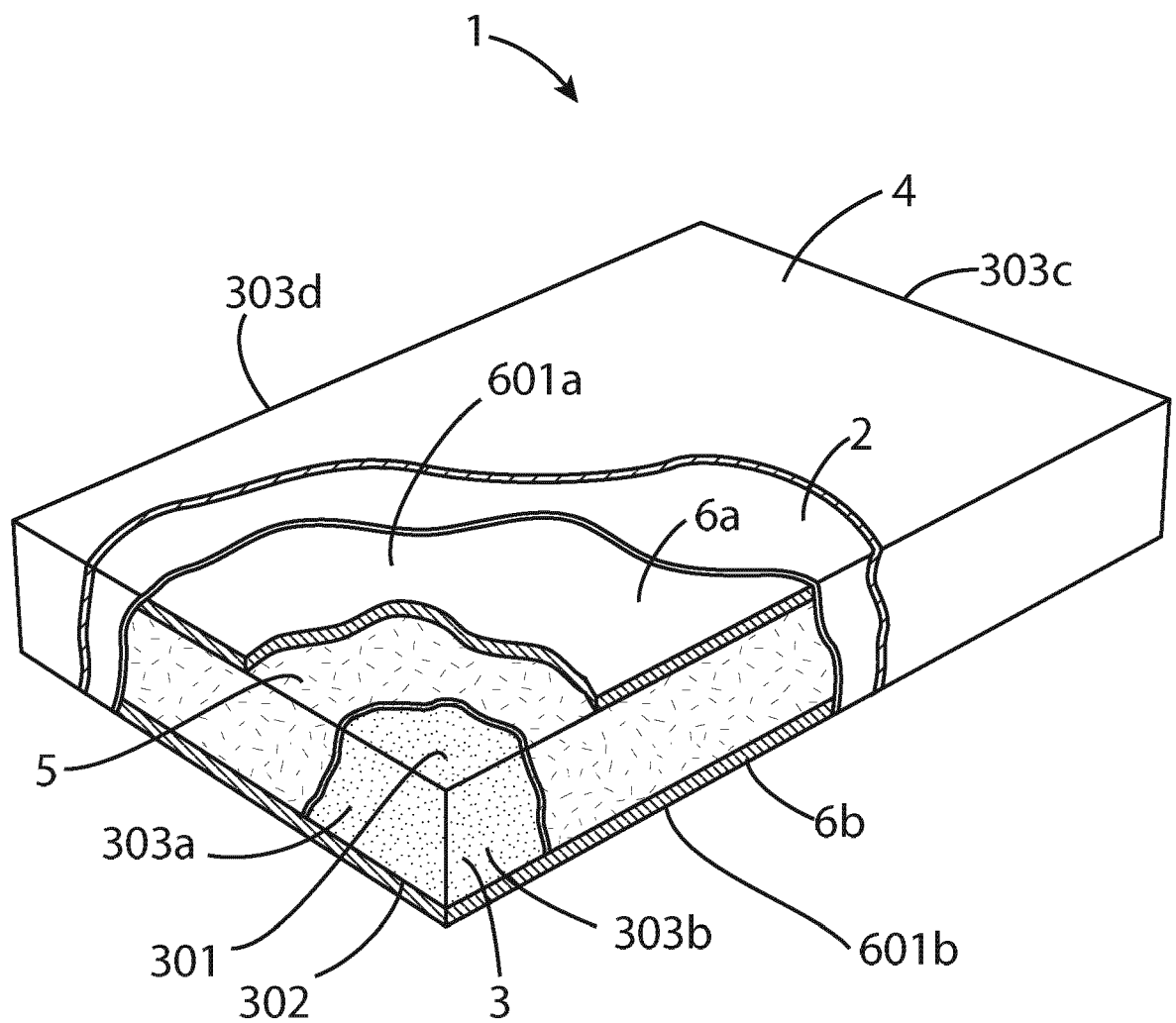
FIG. 4 shows a perspective cut away perspective view of the vacuum insulation panel of FIG. 2.

FIG. 4 shows a perspective cut away view of a VIP 1 according to the present disclosure. In the embodiment shown, the VIP comprises two reinforcing members 6a and 6b. The insulating core 3 is shown encased in a fleece 5. Fleece 5 is an optional component, and may have greater of lesser utility depending on the method of manufacture of the VIP.

Figure 5:
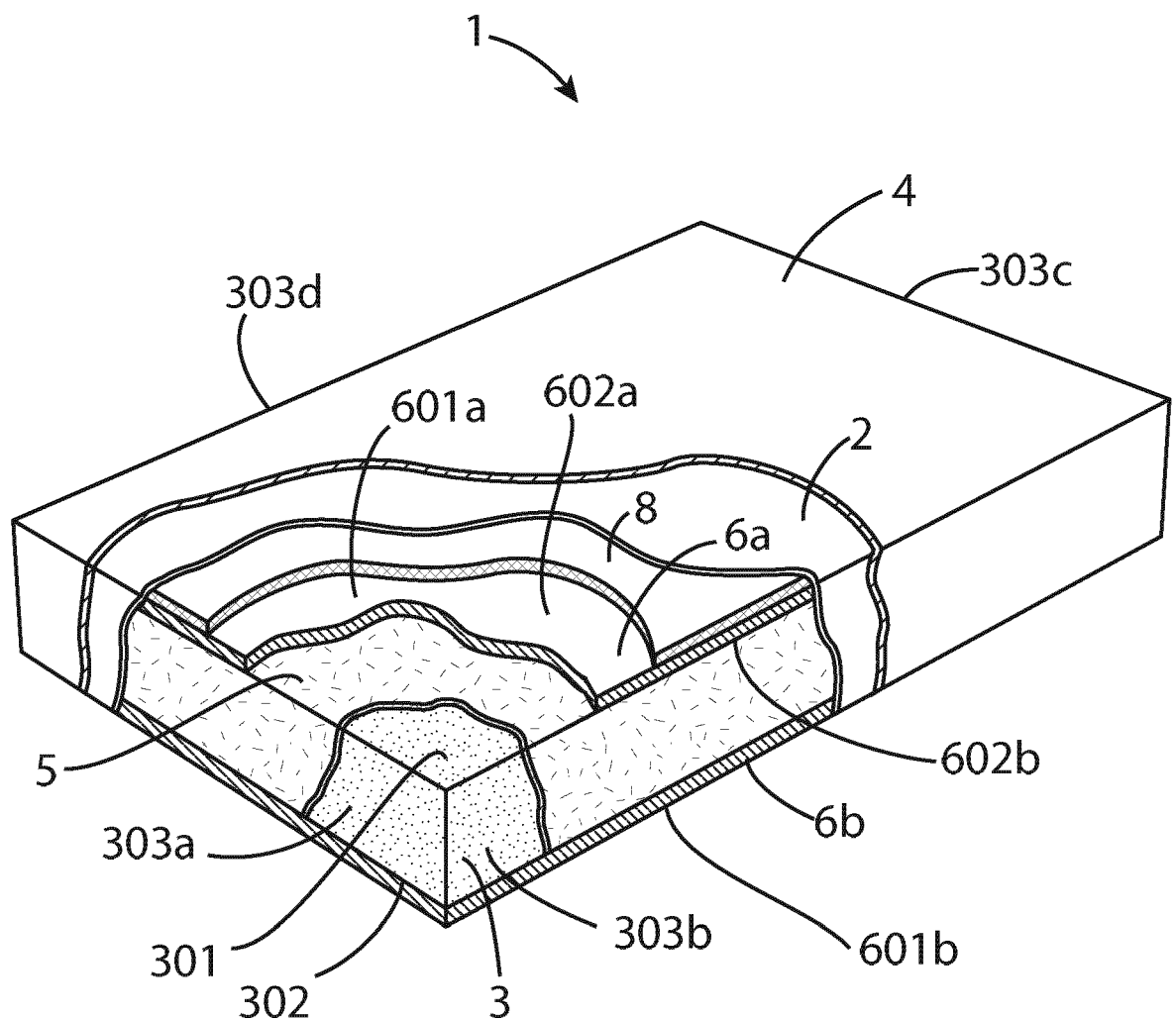
FIG. 5 shows a cut away perspective view of a vacuum insulation panel comprising a hybrid core, having metal foil facers on the reinforcing members.

FIG. 5 shows the embodiment of FIG. 4 wherein the upper reinforcing member 6a further comprises a metal foil facer 8. The metal foil facer may have a thickness of from 4 microns to 50 microns. In the embodiment shown in FIG. 5, the metal foil facer has a thickness of 12 microns. As clearly depicted in FIG. 5, the metal foil does not form a thermal bridge between the upper surface 602a and the lower surface 602b of the reinforcing member 6a.

Advantageously, one or both upper and lower reinforcing members may comprise a metal foil facer. The reinforcing member may for example be a polyurethane foam blown on a metal foil facer. Additionally or alternatively the metal foil facer may be adhered or affixed to a reinforcing member formed from a sheet of polyurethane foam.

Figure 6:
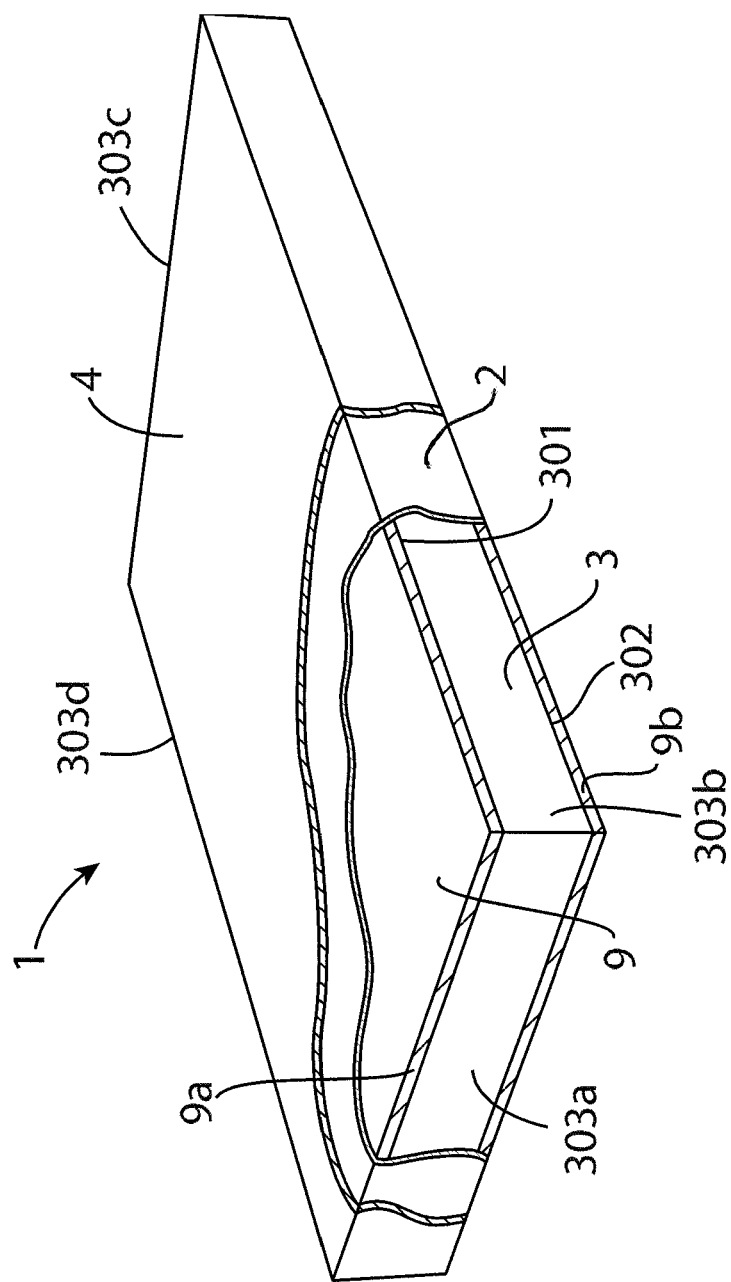
FIG. 6 shows a cut away perspective view of a vacuum insulation panel comprising metal foil layers disposed between the insulating core and the envelope.

FIG. 6 shows VIP 1 as a further embodiment of the disclosure. Corresponding features are numbered as in the foregoing description. VIP 1 is shown comprising a porous insulating core 3, having an upper surface 301 and a lower surface 302 and sides 303a-303d. An envelope 2 about the insulating core 3 is arranged to envelop the core, and to maintain an applied vacuum within the envelope 2. A non-foam polyurethane coating layer 4 is applied to the exterior of the envelope 2. The polyurethane coating layer is formed over the entire external surface area of the envelope 2. A metal foil 9 having a thickness of at from 4 microns to 50 microns is disposed between the envelope 2 and the core 3. A metal foil 9a extends across substantially the entire upper surface 301 of the core, without forming a thermal bridge between the upper surface 301 and the lower surface 302 of the core. A second metal foil 9b extends across substantially the entire lower surface 302 of the core, without forming a thermal bridge between the lower surface 302 and the upper surface 301 of the core. Neither the metal foil 9a, nor the metal foil 9b are attached to the core 3.

Figure 7:
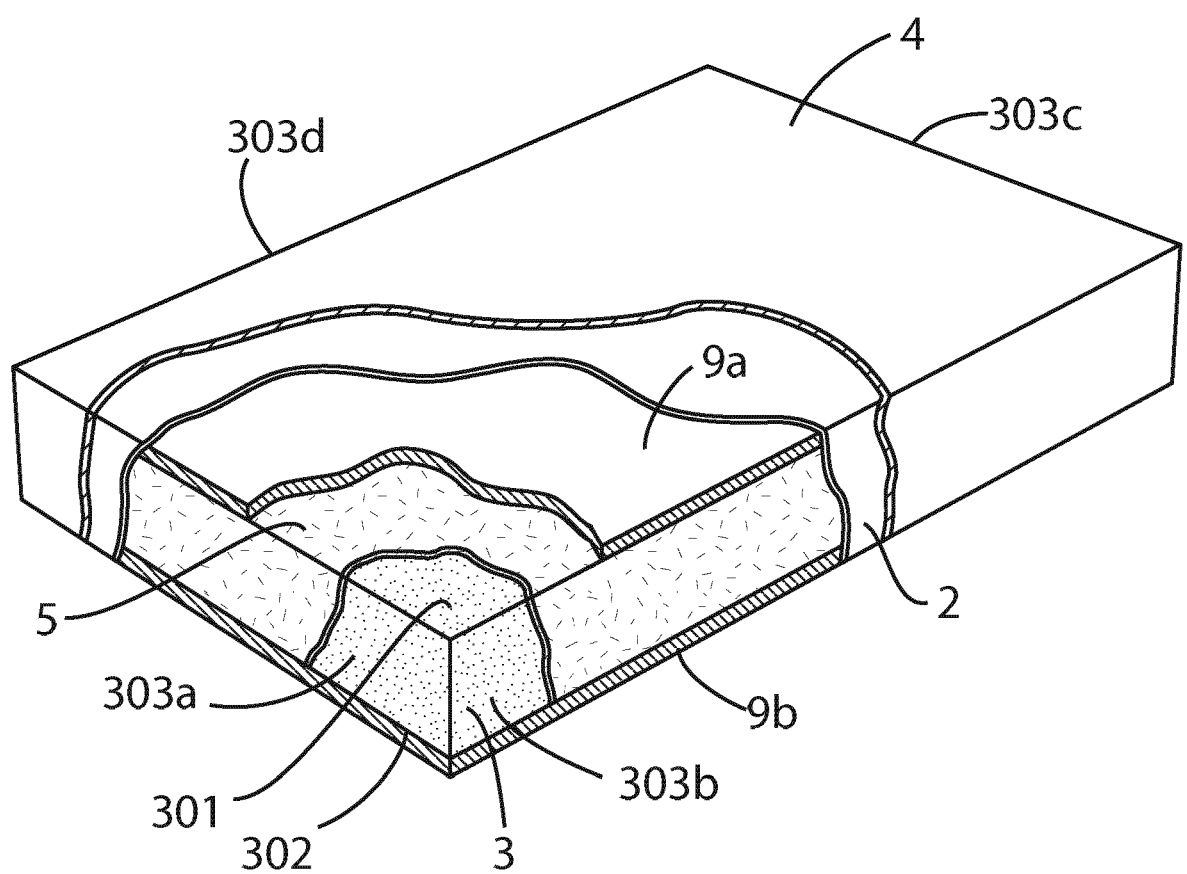
FIG. 7 shows the vacuum insulation panel of FIG. 6 further comprising a fleece encasing the insulating core.

FIG. 7 is a perspective cut-away view of a VIP analogous to that shown in FIG. 6, however, a fleece 5 is shown encasing the insulating core 3. One metal foil 9a is shown atop the fleece 5, on the upper surface 301 of the insulating core 3. A second metal foil 9b is shown below the fleece 5, on the lower surface 302 of the insulating core 3. Neither 9a nor 9b are attached to the core or the fleece 5.

Figure 8:
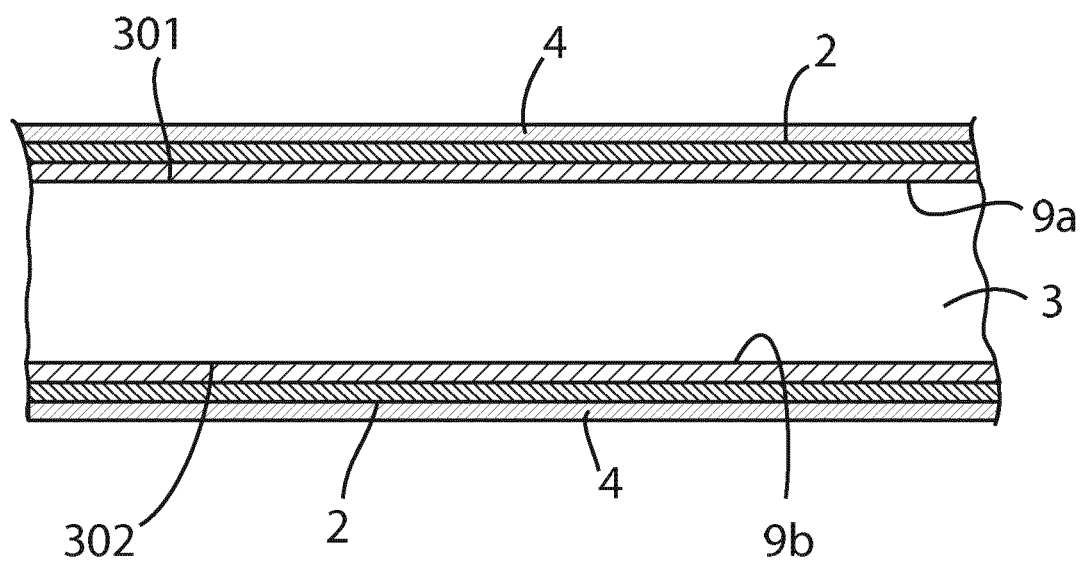
FIG. 8 shows a cross-sectional view of the vacuum insulation panel shown in FIG. 6.

FIG. 8 is a cross-sectional view of a VIP according to the present disclosure. FIG. 8 clearly shows the metal foil 9 disposed between the insulating core 3 and the envelope 2. The non-foam polyurethane layer is shown entirely coating the envelope 2. FIG. 8 shows a metal foil 9a extends across substantially the entire upper surface 301 of the core, without forming a thermal bridge between the upper surface 301 and the lower surface 302 of the core. FIG. 8 also shows a second metal foil 9b which extends across substantially the entire lower surface 302 of the core, without forming a thermal bridge between the lower surface 302 and the upper surface 301 of the core. In some embodiments only metal foil may be present.

It will be noted that the foils 9a and 9b are not attached to the core 3. Instead they are initially separate from the envelope 2 and the core 3 and are later attached to the envelope 2 as will be described below.

Figure 9:
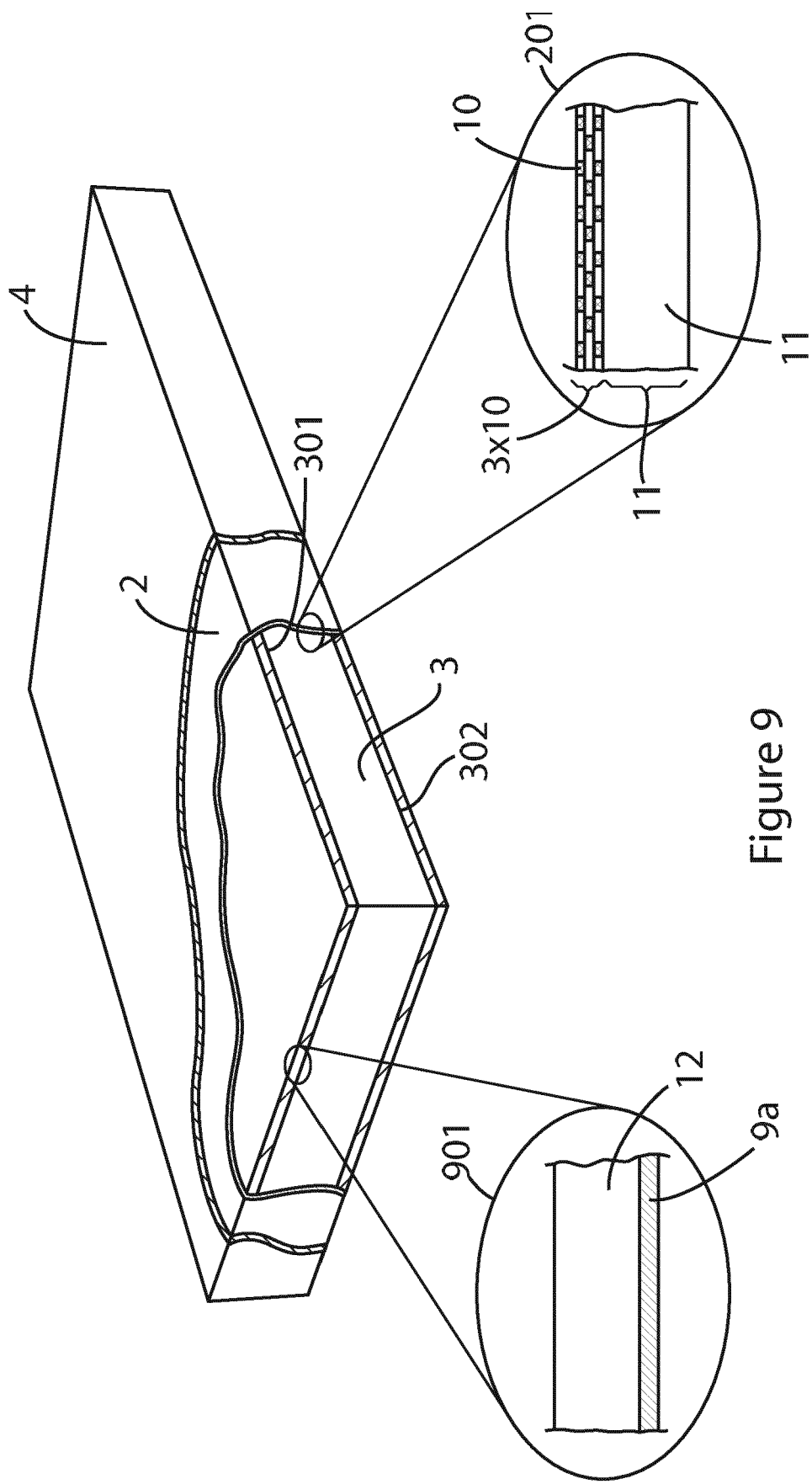
FIG. 9 shows a perspective cut away view similar to FIG. 6, with enhanced views of the metal foil and the envelope.

FIG. 9 is a perspective view of a VIP according to the present disclosure, similar to that of FIGS. 6 to 8, with an enlarged view of the envelope 2 shown as an envelope structure 201 and an enlarged view of the foil 9a shown as a metal foil structure 901. (It will be appreciated that even though there are two separate foils 9a and 9b each may have the same structure.) The enlarged view of the envelope structure 201 shows three metalized films 10. Each metalized film 10 is a metalized plastic layer of for example metalized PET. Suitably, metalized polypropylene (PP) or metalized EVOH (ethyl vinyl alcohol) may also be employed. The metalized films 10 are attached to an envelope inner layer 11. The envelope inner layer 11 is typically a thermoplastic polymer, such as polyethylene. Suitable alternatives include low density polyethylene (LDPE) e.g. linear low density polyethylene (LLDPE), and ultra-high molecular weight polyethylene (UHMWPE); polypropylene and ethylenevinyl alcohol (EVOH), polyvinylidene chloride (PVDC); thermoplastic urethanes; including combinations thereof including copolymers and blends thereof.

The enlarged view of the metal foil structure 901 shows the metal foil 9a with an outer layer 12 attached thereto. The outer layer 12 is typically a thermoplastic polymeric material, for example polyethylene.

Figure 10:
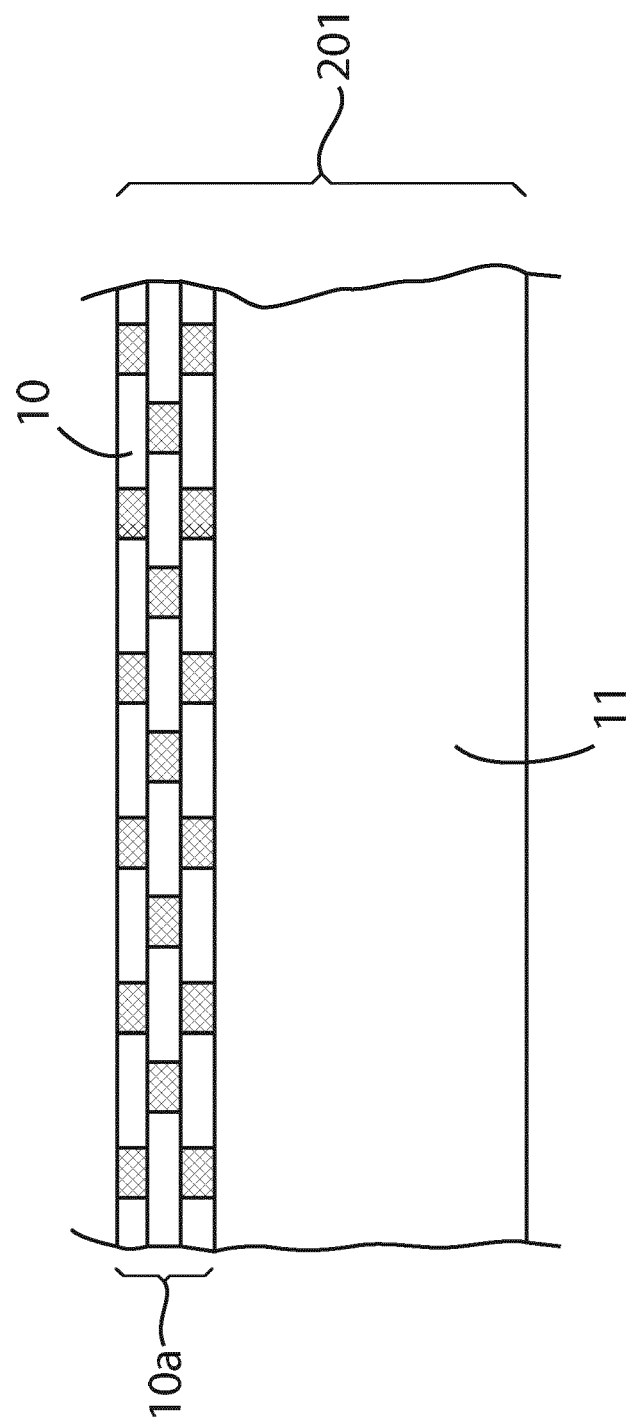
FIG. 10 shows a cross-sectional view showing the construction of the envelope structure.

FIG. 10 is a cross-sectional view showing the construction of the envelope structure 201. The layers of metalized film 6 are bonded together for example to form a laminate 61. Each layer (i.e. polymer film and metal applied to it taken together) is typically about 12 micron thick. The laminate structure is bonded to an inner envelope layer 7 of thermoplastic material, for example a layer of polyethylene.

FIG. 11 is a cross-sectional view showing the construction of the metal foil structure. The metal foil 9 is typically aluminum foil. The metal foil 9 is attached to an outer layer 12 of thermoplastic material, for example a layer of polyethylene. Optionally the metal foil 9 is attached to an inner layer 13 of a suitable polymer, for example PET.

Figure 12B:
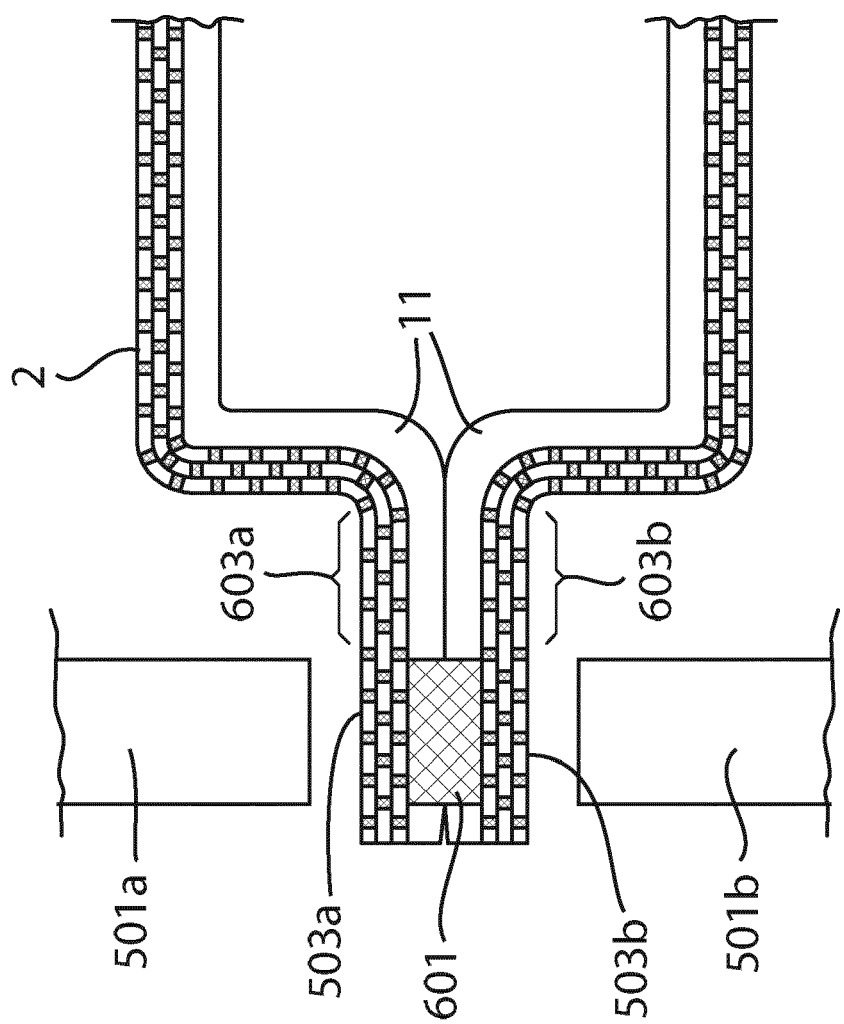

FIGS. 12A and 12B show a cross-sectional view depicting method of sealing and the seal obtained when a VIP envelope is sealed. The skilled person will appreciate that the VIP is sealed, prior to the non-foam polyurethane coating layer being applied to the envelope, so as to coat the entire (external) surface area of the envelope.

As shown in FIG. 12A heating irons or jaws 501a and 501b are employed to grip opposing sides (upper side grip 502a and lower side grip 502b) of the envelope 2 bringing them together and said jaws apply heat to the edges 503a (upper edge) and 503b (lower edge) of the opposing sides 504a (upper side) and 504b (lower side) of the envelope 2. An inner layer of polymer 11 on the inside surface 505 of the envelope 2, between the edges 503a and 503b gripped by the heating jaws 501a and 501b, softens sufficiently, to form a bond 601 between the edges 503a and 503b of the envelope 2 in contact with each other between the heating jaws 501a and 501b (see FIG. 12B). Only the inner layer of polymer 11 exposed to the application of heat softens to for a bond or seal 601 between the edges 503a and 503b. The application of heat from the heating irons or jaws 501a and 501b to the edges of the envelope 503a and 503b, does not soften the inner layer of polymer 11 substantially beyond the gripped edges 503a and 503b of the envelope 2. Hence, the application of heat from heating jaws 501a and 501b does not cause proximate edge portions 603a and 603b to bond to each other. Furthermore, the metal foils 9 within the evacuated VIP 1 are not attached to the inner layer of the envelope at this stage in production.

Figure 13:
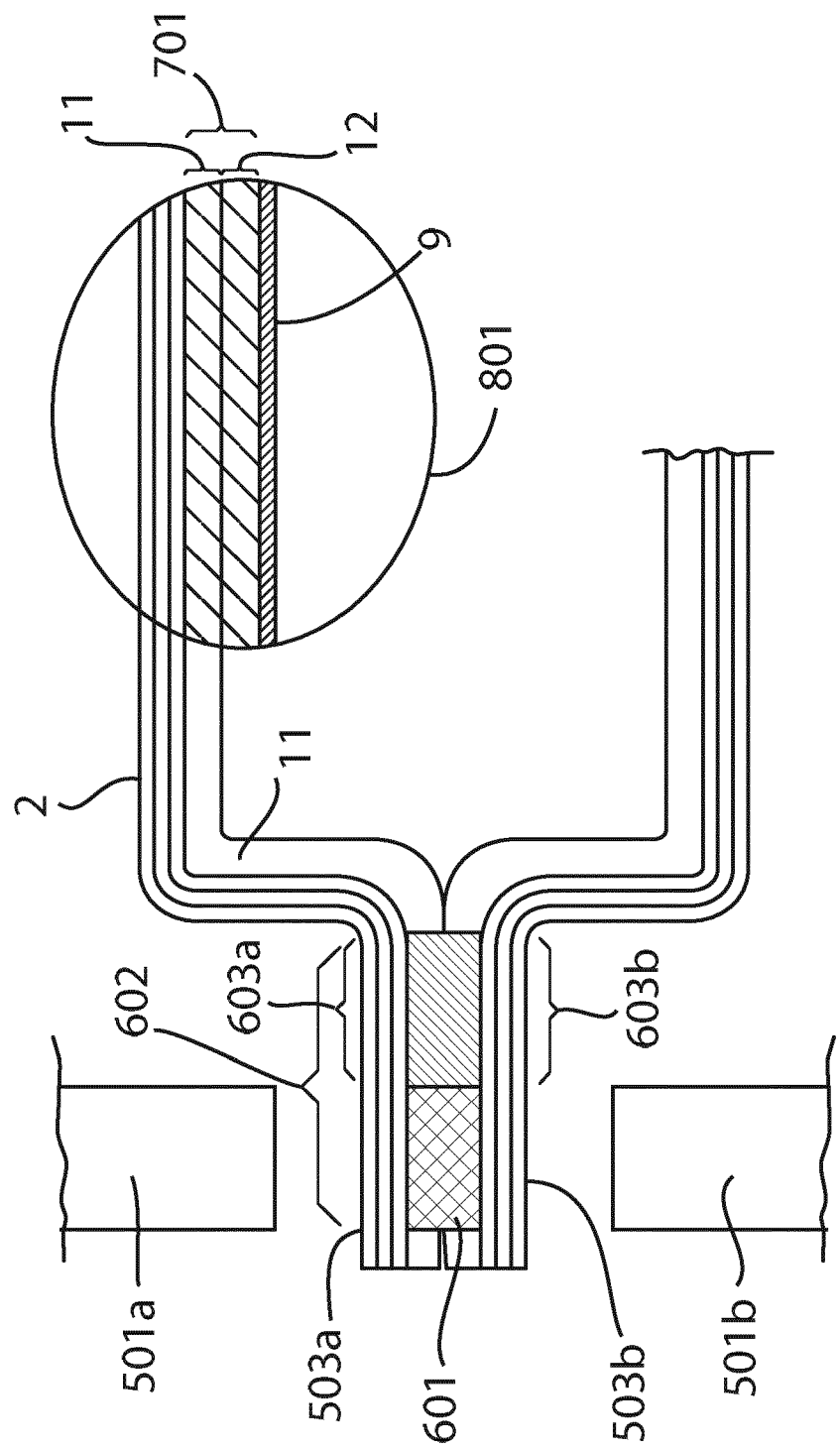
FIG. 13 is a cross-sectional view depicting the sealed edge of the envelope of a vacuum insulation panel.

FIG. 13 is a cross-sectional view depicting the seal 602 obtained when the envelope 2 of a VIP according to the present disclosure is sealed. Similar to the method described in relation to FIG. 12A and FIG. 12B above, heating jaws 501a and 501b apply heat to bond the edges 503a and 503b of the envelope 2 of VIP 1. As described above, seal 601 is formed by application of heat from heating jaws 501a and 501b to said edges. The entire VIP is subsequently heated to attach each of the metal foils 9 to the inner layer 11 of the envelope 2. As shown in the enhanced view 801 of FIG. 14 once the entire VIP 1 is heated, the inner layer 11 of the envelope 2 softens as does the outer layer 12 on the metal foil 9, thereby forming a bond 701 between the metal foil 9 and the envelope 2. The skilled person will appreciate that while the entire upper metal foil 9a and the entire lower metal foil 9b are not shown in FIG. 13, at least one or both may be present. In addition, by heating the entire VIP, to attach the inner layer 11 of the envelope 2 to the metal foil 9, the inner layer 11, at proximate edges 603a and 603b of the envelope 2, which were not directly exposed to the heat of the heating jaws 501a and 501b, soften sufficiently, to provide an enhanced edge seal 602 about the envelope 2. It will be appreciated that not only does the vacuum assist with bonding of the metal foil(s) 9 to the envelope but also in drawing together the parts of the envelope about the initial seal, and in particular those on the interior side, i.e. the vacuum side, of the initial seal. Accordingly, VIPs of the present disclosure have an improved envelope seal in comparison to those of traditional VIPs. An enhanced seal increases the longevity of the VIP and contributes to an improved aged thermal performance of the VIP.

Figure 14:
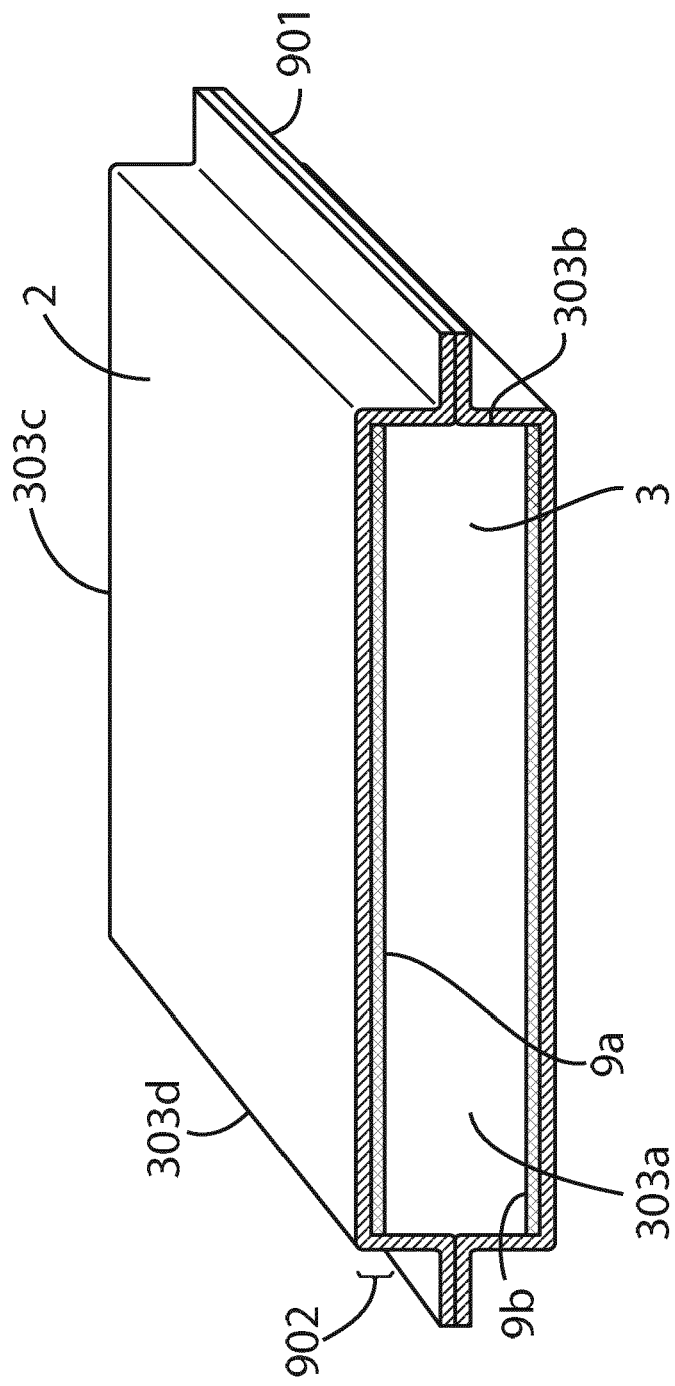
FIG. 14 is a perspective and cross-sectional view of a vacuum insulation panel.
Figure 15:
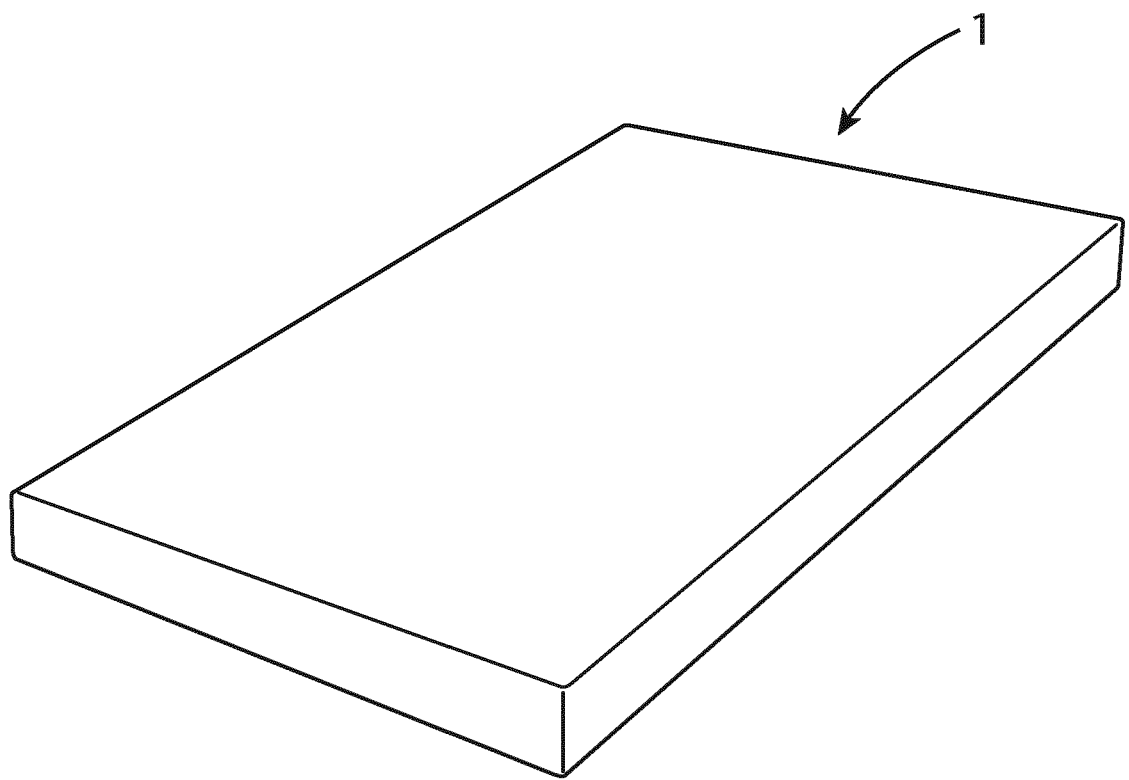
FIG. 15 is a perspective view of a vacuum insulation panel of the present disclosure.

FIG. 14 is a perspective cross-sectional view of a VIP according to the present disclosure prior to application of the non-foam polyurethane coating layer, showing the envelope seal 901 at the sides of the VIP (only the envelope seal proximate sides 303b and 303d of the insulating core 3 are shown). FIG. 15 clearly shows the metal foils 9a and 9b disposed between the insulating core 3 and the envelope 2. 902 shows how the metal foil 9a is arranged so as not to form a thermal bridge across the insulating core, as the metal foil does not wrap around the sides 303a-303d of the insulating core. FIG. 15 shows the VIP according to the present disclosure prior to folding and taping the edges, and prior to application of the non-foam polyurethane coating.

FIG. 15 is a perspective view of a VIP 1 according to the present disclosure, wherein the edge seals have been folded and taped to provide a substantially cuboid finished VIP, and a non-foam polyurethane coating layer has been applied to the envelope, coating the entire (external) surface area of the envelope.

The ability of a VIP envelope to maintain a defined vacuum during the lifetime of a VIP is of great importance in achieving and maintaining long-term thermal performance. Thermal edge effects occur due to the relatively high thermal conductivity of the envelope material which envelops the insulating core. Thermal edge effects are observed because the envelope acts as a thermal bridge around the insulating core, which has a very low thermal conductivity, once a vacuum is maintained, within the VIP.

Choosing a material suitable for a VIP envelope is therefore a balance between selecting a material with a desirably low thermal conductivity and a low permeation. Metalized films as described above which are employed as envelopes in traditional VIPs have a reasonably low thermal conductivity. However, their permeability substantially reduces the lifetime and therefore, overall utility of traditional VIPs.

The thermal conductivity of aluminium is 167 W/(m·K). Accordingly, aluminium is not a suitable material for a VIP envelope, due to the high edge effects which would be observed as a consequence of aluminium's high thermal conductivity value. However, aluminium foils have excellent barrier properties.

VIPs of the present disclosure comprising a metal foil layer of from 4 microns to 50 microns, provide a significant advancement over prior art VIPs. Such VIPs marry the desirable low thermal conductivity properties of traditional VIP envelopes with the desirable low permeability properties of metal foils.

For the embodiments shown in FIGS. 5 to 15, after a vacuum is applied and the edge of the VIP is sealed, the metal foil disposed between the inner surface of the envelope and at least the upper surface of the insulating core, whether in the configuration shown in FIG. 5, or as shown in FIGS. 6 and 7 is attached to the inner surface of the envelope. For example, the metal foil may be attached to an outer layer of thermoplastic material, such as polyethylene and the envelope may have an inner envelope layer made of a thermoplastic material, such as polyethylene. As the VIP is evacuated the outer surface on the metal foil will be in close proximity to the inner surface of the envelope inner layer. When the VIP is heated, for example in an oven, to a temperature sufficiently high to soften the thermoplastic materials, the metal foil becomes attached to the inside surface of the envelope. The metal foil is arranged so as not to form a thermal bridge across the insulating core. However, the excellent low permeation properties of the foil significantly improve the permeation properties of the VIP. Accordingly, the lifetime of the VIP is significantly increased. It will be appreciated that the attachment of the foil to the envelope can be done after the VIP has been formed and in particular after any vacuum source has been removed. The vacuum retained within the envelope will assist in joining the foil to the envelope. Effectively the pressure differential between atmospheric pressure to the exterior of the VIP and the retained (reduced) pressure within the VIP imparts a force pressing the envelope towards the foil (and the core). And of course this force is imparted uniformly across the envelope. This is ideal for uniform joining of the envelope to the foil.

The procedural step of heating the evacuated VIP in an oven also improves the original heat seal at the edge of the envelope.

Because the envelope of a VIP is traditionally sealed between heating jaws as described above, only the area of the envelope directly exposed to the heat of the heating jaws is heated sufficiently in order to melt the thermoplastic inner envelope layer and join the two proximate edges. Edges of the envelope in close proximity which have not been exposed to elevated temperature are not joined/bonded.

In contrast, in the embodiment described above, whereby the metal foil of a VIP according to the present disclosure is attached to the inner surface of the VIP envelope, by heating the entire VIP (post evacuation), edges of the envelope which are proximate, which were not originally bonded by the heating jaws, remain proximate due to the external pressure applied to the evacuated VIP and when heated the thermoplastic layers of said edges soften and a bond is formed therebetween.

Thus while the presence of the metal foil attached to the envelope, provides an ultra-low permeation envelope, the seal of the VIPs of the present disclosure are considerably enhanced, in comparison to those of traditional VIPs, accordingly, the lifetime of the VIPs of the present disclosure are significantly longer than traditional VIPs without reducing the thermal performance.

The VIP envelopes shown in FIGS. 5 to 15 have an oxygen transmission rate of about $4 \times 10^{-3}$ cc/m$^2$·day and a moisture vapour transmission rate of about $2.5 \times 10^{-3}$ g/m$^2$·day.

The presence of the non-foam polyurethane coating substantially increases the robustness of the VIP. The polyurethane coating provides a protective coating on the outer surface of the VIP which provides the VIP with a waterproof coating, and also increases the barrier protection, making accidental perforation of the VIP less likely. Accordingly, the VIPs of the present disclosure, are less susceptible to damage, for example when stored on site, prior to installation.

Suitably, the non-foam polyurethane coating provides excellent wear resistance and long term durability to the VIP. For example, the polyurethane coating may in addition to providing waterproofing, also provide resistance to damage from UV rays or resistance to corrosive materials such as acidic materials. Suitably, the polyurethane coating is flexible and crack resistant.

The words "comprises/comprising" and the words "having/including" when used herein with reference to the present disclosure are used to specify the presence of stated features, integers, steps or components but do not preclude the presence or addition of one or more other features, integers, steps, components or groups thereof.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

What is claimed is:
1. A vacuum insulation panel comprising:
 (a) a porous insulating core having an upper surface and a lower surface and sides;
 (b) an envelope about the core arranged to envelop the core, and to maintain an applied vacuum within the envelope; and

(c) a non-foam polyurethane coating layer applied to the envelope, wherein the coating layer is formed over the entire surface area of the envelope, the polyurethane coating layer is less than about 5 mm thick and (d) the envelope and the polyurethane coating layer form a barrier layer about the insulating core, the barrier layer having a moisture vapour transmission rate of from about $1.5 \times 10^{-3}$ g/m$^2 \cdot$day to about $3.0 \times 10^{-3}$ g/m$^2 \cdot$day when measured in accordance with ASTM F1249-90.

2. The vacuum insulation panel according to claim 1, wherein the envelope comprises a metallised film.

3. The vacuum insulation panel according to claim 1, wherein the polyurethane coating layer is from about 0.1 mm to about 3 mm thick.

4. The vacuum insulation panel according to claim 1, wherein the polyurethane coating layer has a vapour resistivity of from 5000 MN·s/gm to 100000 MN·s/gm or more.

5. The vacuum insulation panel according to claim 1, wherein the polyurethane coating layer is formed from a polyurethane resin composition comprising a first isocyanate containing part and a second polyol containing part.

6. The vacuum insulation panel according to claim 1, wherein the barrier layer has a moisture vapour transmission rate of about $2.5 \times 10^{-3}$ g/m$^2 \cdot$day or less, when measured in accordance with ASTM F1249-90.

7. The vacuum insulation panel according to claim 1, wherein the barrier layer having an oxygen transmission rate of from about $2 \times 10^{-3}$ cc/m$^2 \cdot$day to about $5 \times 10^{-3}$ cc/m$^2 \cdot$day when measured in accordance with ASTM D3985.

8. The vacuum insulation panel according to claim 1, wherein the barrier layer having a moisture vapour transmission rate of about $2.5 \times 10^{-3}$ g/m$^2 \cdot$day or less, and an oxygen transmission rate of about $4 \times 10^{-3}$ cc/m$^2 \cdot$day or less.

9. The vacuum insulation panel according to claim 1, wherein the porous insulating core is constructed from a microporous powder material selected from silica, fumed silica and/or precipitated silica, perlite, diatomaceous earth and combinations thereof.

10. The vacuum insulation panel according to claim 1, having a thermal conductivity of from 3.0 mW/(m·K) to 4.5 mW/(m·K).

11. The vacuum insulation panel according to claim 1, further comprising at least one reinforcing member arranged on the upper or lower surface of the insulating core to reinforce the core, wherein the reinforcing member is formed of a porous material, and is substantially rigid; wherein together the at least one reinforcing member and the insulating core form a hybrid core and the reinforcing member(s) do not form a thermal bridge across the insulating core; and wherein the envelope is arranged to envelop the hybrid core.

12. The vacuum insulation panel according to claim 11 having an upper reinforcing member arranged on the upper surface of the insulating core and having a lower reinforcing member arranged on the lower surface of the insulating core.

13. The vacuum insulation panel according to claim 11 wherein the at least one reinforcing member comprises a metal foil facer, the metal foil facer having a thickness of from 4 microns to 50 microns, and extending across substantially the entire surface of the reinforcing member, on the upper surface or lower surface thereof and wherein the metal foil facer does not form a thermal bridge between the upper surface and lower surface of the reinforcing member.

14. The vacuum insulation panel according to claim 11, wherein the density of the insulating core within the vacuum insulating panel is of from 100 kg/m$^3$ to 160 kg/m$^3$.

15. The vacuum insulation panel according to claim 11, wherein the at least one reinforcing member(s) has a density that is lower than that of the insulating core.

16. The vacuum insulation panel according to claim 11, further comprising at least one metal foil having a thickness of from 4 microns to 50 microns, between the envelope and the insulating core and extending across substantially the entire surface of the insulating core on the upper surface or lower surface thereof and wherein the foil does not form a thermal bridge between the upper surface and lower surface of the insulating core.

17. The vacuum insulation panel according to claim 16, wherein the metal foil is attached to the inside of the envelope.

18. The vacuum insulation panel according to claim 17, wherein the envelope comprises an envelope inner layer and the metal foil has at least one outer layer attached thereto wherein the envelope inner layer and the outer layer on the metal foil are attached to each other being optionally bonded to each other.

19. The vacuum insulation panel according to claim 16, comprising two metal foils having a thickness of from 4 micron to 50 micron, wherein one metal foil extends across substantially the entire surface of the core on the upper surface and a second metal foil extends across substantially the entire surface of the core on the lower surface.

20. The vacuum insulation panel according to claim 1, further comprising a layer of adhesive on the outer surface of the panel.

21. The vacuum insulation panel according to claim 20, wherein the adhesive is a pressure sensitive adhesive.

* * * * *